US012785988B1

(12) United States Patent
Dorenboust

(10) Patent No.: US 12,785,988 B1
(45) Date of Patent: Nov. 3, 2026

(54) BLOCKCHAIN-SECURITY BASED TWO-FACTOR AUTHENTICATION (2FA) AND MULTI-SIGNATURE SECURITY SYSTEM BASED IN PART ON CRYPTOGRAPHIC PERMISSIONS

(71) Applicant: Lior Dorenboust, Rishon Lezion (IL)

(72) Inventor: Lior Dorenboust, Rishon Lezion (IL)

( * ) Notice: Subject to any disclaimer, the term of this patent is extended or adjusted under 35 U.S.C. 154(b) by 0 days.

(21) Appl. No.: 19/301,159

(22) Filed: Aug. 15, 2025

(51) Int. Cl.
*H04L 29/06* (2006.01)
*H04L 9/08* (2006.01)
*H04L 9/32* (2006.01)

(52) U.S. Cl.
CPC .......... *H04L 9/3252* (2013.01); *H04L 9/0897* (2013.01)

(58) Field of Classification Search
CPC ............................ H04L 9/3252; H04L 9/0897
See application file for complete search history.

(56) References Cited

U.S. PATENT DOCUMENTS 12,107,962 B1 * 10/2024 Helinski .............. G06K 7/1417
2020/0013052 A1 * 1/2020 Fok ........................ H04L 9/3239
2022/0045867 A1 * 2/2022 Beery .................... H04L 9/0861
2022/0327530 A1 * 10/2022 Pagter ...................... H04L 9/085
2026/0012348 A1 * 1/2026 Jurss .................. G06Q 20/3674

OTHER PUBLICATIONS

Ahsan, Talha, et al. "IoT devices, user authentication, and data management in a secure, validated manner through the blockchain system." Wireless Communications and Mobile Computing 2022.1 (2022): 8570064. (Year: 2022).*

* cited by examiner

*Primary Examiner* — Ka Shan Choy
(74) *Attorney, Agent, or Firm* — SNELL & WILMER L.L.P.

(57) ABSTRACT

A method for two-factor authentication (2FA) in a blockchain-based user identification and security system and implementing the process of validation and transparency of the blockchain to physical services in the real world using cryptographic permissions and a system for enjoying the decentralized validation and transparency of the blockchain in the real world using a device that connects and serves as a connector between the real world and the blockchain.

17 Claims, 42 Drawing Sheets

Passive NFC Tags

| storage | function | Name of Key |
|---|---|---|
| Carried in a bag, worn as a bracelet or ring, or integrated into a smartphone | Daily authentication and signing using the dailyKey (supports 2FA/SFA | DailyKey |
| Stored in a secure yet accessible place at home | A dedicated backupKey used to maintain control over the dailyKey and replace it in case of loss, malfunction, or theft | BackupKey |
| should be stored in a highly secure location, such as a bank safe | Is the highest authority within the key hierarchy. It can replace a backupKey, add new masterKeys, or revoke the entire keySet | MasterKey |

A Cold Wallet

Tag2FA

Passive NFC Tags

| storage | function | Name of Key |
| --- | --- | --- |
| Carried in a bag, worn as a bracelet or ring, or integrated into a smartphone | Daily authentication and signing using the dailyKey (supports 2FA/SFA | DailyKey |
| Stored in a secure yet accessible place at home | A dedicated backupKey used to maintain control over the dailyKey and replace it in case of loss, malfunction, or theft | BackupKey |
| should be stored in a highly secure location, such as a bank safe | Is the highest authority within the key hierarchy. It can replace a backupKey, add new masterKeys, or revoke the entire keySet | MasterKey |

*fig. 3*

An ECDSA Example

*string message to sign on*

*ECDSA output*

*tagPublicAddress - 0x8C...42F46C,*
*r - 0x35b51e4b...79cb55c706d2f,*
*s - 0x544abd7cff9...a9eb640se49*

TagSticker

Portal - initSetKey
setKey parameters

Portal - InitSetKey
A - call initSetKey

Portal - initSetKey
B - call initSetKey

Portal - AddMultipleBackupKeys
call addMultipleBackupKeys

Portal - AddMultipleMasterKeys call addMultipleMasterKeys

Portal - AddMultipleMasterKeys
A - call addMultipleMasterKeys

Portal - ReplaceDailyKey
A - call replaceDailyKey

Portal - ReplaceMasterKey
call replaceMasterKey

Portal - ReplaceMasterKey
A - call replaceMasterKey

Portal - VerifyDailyKey
A & B - call verifyDailyKey

0xProduct - FlagNFTAsAutographed
call addAutograph

0xProduct - SecounderyMarket
call transferProduct (seller)

0xProduct - SecounderyMarket approveTransfer (buyer)

0xProduct - SecounderyMarket
A - approveTransfer (buyer)

Crypto - External SmartContract Integration with Portal protect sensitive operations

Crypto - External SmartContract Integration with Portal protect sensitive operations using Deploy Contract Wallet (Proxy)

0xSmartLogin - 0ffchain Auth
client/agent

BLOCKCHAIN-SECURITY BASED TWO-FACTOR AUTHENTICATION (2FA) AND MULTI-SIGNATURE SECURITY SYSTEM BASED IN PART ON CRYPTOGRAPHIC PERMISSIONS

FIELD

A touchpoint on-chain linked universe plug and play system. The purpose of the invention is to add a strong security layer of authentication (2FA) to critical operations on the blockchain network, to enhance security without compromising the simplicity of use and the burden of development. The entire system is based on smart agreements and cryptographic permissions, with no central server outside the chain.

BACKGROUND OF THE INVENTION AND PRIOR ART

The system serves as a bridge between real-world processes and blockchain networks. A blockchain is a decentralized, distributed ledge, (often described as a decentralized database), that records and validates exchanges across a peer-to-peer network, sharing authority, control, and data among participants rather than concentrating them in a single entity. In public (permissionless) blockchains, the entire ledger is transparent and accessible to anyone with an internet connection.

In the blockchain environment, a smart agreement (e.g., a smart contract) is a self-executing program stored on the ledger that encodes and enforces arbitrary business logic validating exchanges, automating workflows, and managing digital assets or permissions in a decentralized, trustless network. When a smart agreement is deployed to the blockchain network, it cannot be updated or edited afterwards.

A decentralized database and a centralized database differ primarily in their structure and management.

A centralized database is managed and maintained by a single authority. This means that all data is stored on a single server or a group of servers in one location and a single authority controls the entire server_infrastructure. The main advantages of centralized databases include easier data management, consistency, and control. However, they can be vulnerable to single points of failure if the central server goes down, the entire database becomes inaccessible. They also require full trust in a single authority that can change the rules governing the data store, which can lead to censorship or unauthorized data manipulation, performance bottlenecks under heavy load, and increased infrastructure and maintenance costs.

On the other hand, a decentralized database distributes data across multiple independent nodes rather than relying on a single central server. In blockchain-based systems, these nodes participate in a consensus protocol to validate and append exchanges to an immutable, append-only ledger.

This architecture enhances fault tolerance, availability, and censorship resistance if one node fails, the network continues operating and ensures that no single party can alter past records.

The blockchain is decentralized so it is exposed to the public and cannot be changed after deploying. Deploying means publishing the code of the agreement to the blockchain network so that it becomes an independent account with an address and is available for operation by other users or agreements. The title of transparency is preserved.

There is difficulty in implementing the process of validation and transparency of the blockchain to physical services in the real world, and it remains only in the consumption of digital services.

The prior art teaches some possibilities for adding a strong layer of authentication (2FA) to critical operations on the blockchain.

Mastercard's 2FA for Blockchain Exchanges (U.S. Pat. No. 11,025,431 B2), disclosed a method of two-factor authentication within the exchange on the blockchain itself. The idea: A public key and an "expected data value" are stored on a node. When a exchange is sent, the node looks for a separate "sidechain" exchange that contains the same data value (e.g., a one-time code) and is sent to an address derived from the user's public key. Then two checks are performed: (1) Verifying the normal digital signature of the exchange with the public key, and (2) Verifying that the value of the data in the party exchange corresponds to the expected value (the second factor). Only if both are transferred, the exchange is transferred to the blockchain network.

A user makes a "mini exchange" on the side that provides a secret code, so a 2FA mechanism is maintained tied to the blockchain. In Mastercard, the second factor is the value of data in a SIDECHAIN_exchange (like OTP), whereas in the new disclosure it is a cryptographic signature of a NFC (Near Field Communication) key. The patent requires a change in the node software or the use of a sidechain, while the new disclosure is based on a central smart agreement for all dApps (Decentralized applications).

Another disclosure "Using a Blockchain Wallet as 2FA" (US20240386417A1to Coinbase), disclosed a crypto What is as a second factor for authenticating logins to other services. After a regular password, the server sends a "challenge" to the user's wallet address. The wallet signs off on the challenge, and the server verifies the signature to complete the login. Whereas in the new disclosure the 2FA is embedded into the exchange itself in the smart agreement logic.

Another disclosure of Sony Blockchain-Based MFA System (U.S. Pat. No. 10,630,667B2) creates a "random exchange" on the blockchain as a validation challenge. The client initiates a exchange between accounts, generates code based on the exchange details, and sends it to the server to check the blockchain records for the code to match. Sony uses an external server that verifies code as opposed to a smart agreement operation that checks key signing in real time.

Another disclosure of SAP Blockchain Integrated OTP (U.S. Pat. No. 11,336,430 B2) where SAP combines OTP codes (such as 6 digits) with the blockchain so that OTP records are stored on the blockchain, and the challenge validation system is done against the blockchain logs to prevent counterfeiting. SAP rely on human codes (OTP), whereas the new disclosure uses key auto-signing, and prevents agreement transfers without a cryptographic signature.

Another disclosure of "On-Chain Push-Mode MFA" Smart Contract System (US 20240273170A1) disclosed a distributed MFA service provider (smart agreement) that manages a 2FA status for each user. An external server updates (pushes) the 2FA status on the smart agreement, and other dApps ask the agreement if authentication is required to activate a protected function. In the patented Push-Mode the mode is flag (on/off) and the second factor authentication is done off-chain, whereas in the new disclosure each operation requires an official signature (r,s) of the key, which is tested on-chain.

Another disclosure of Conio Blockchain Agnostic Multi-Signature Wallet (U.S. Pat. No. 11,915,314 B2) disclosed an MPC/threshold off-chain wallet that generates a single standard signature that hides the multiplicity of signatures (e.g. 2 out of 3), so the blockchain sees only a regular signature. Conio does all the off-chain signing processes to hide the mechanism, whereas in the new disclosure everything is done on-chain and visible (smart agreement checks for another signature).

Another disclosure of An Effective Multi-Signature Method (CN 112989436B) disclosed Multisig protocol enhancer (Schnorr/ECDSA) to reduce communication rounds and prevent "rogue key" attacks. It is a cryptographic invention for merging multiple signatures into one effective signature. The patent focuses on a new algorithm, while the new disclosure uses a standard ECDSA and a key for 2FA.

All the above prior art is different from the new disclosure which is a system where a physical NFC key signs a blockchain exchange, and a decentralized smart agreement verifies the signature.

Prior art does not solve several challenges related to implementing the process of validation and transparency of the blockchain to physical services in the real world, that is introduced hereunder by the new system and method.

SUMMARY

A method for two-factor authentication (2FA) in a blockchain-security based user identification system that using in part cryptographic permissions and implementing the process of validation and transparency of the blockchain to physical services in the real world to enhance security that includes assigning, by agreement owner, at least three passives Near Field Communication (NFC) Tags (keySet) to a user: DailyKey-Daily one key per set used for signing and 2FA authentication, BackupKey—Dedicated backup for restoration or replacement and MasterKey—Root Authority, wherein the agreement owner is responsible for assigning the tags and registering them on-chain and wherein the Portal's role is a smart agreement-based verification node for key approval; registering the KeySet of user by Portal on the blockchain when user calls the function portalSmartContract.initKeySet; allocating a universally unique identifier (UUID) to the user, wherein said UUID is immutable following assignment; generating a private key in a random and secure manner by the Tag without revealing the private key to the user and transmitting the tags to the user, permitting the user to update to a new set of Tags while maintaining the original UUID. Wherein the system employs the UUID and Tags for subsequent cryptographic authentication events; and assigning a tagKeySet (daily, backup, master) linked to a walletSenderAddress and as a result, two Asymmetric encryption keys base signature (ECDSA) signatures are required: 1. from the dailyKey within the system, and 2. from the walletSenderAddress linked to the dailyKey.

In some aspects, the method can further provide for enhanced security measures specifically designed to address the risks associated with malware and the use of hot digital asset tools in asset services, such as digital wallets. In certain embodiments, the system is configured to mitigate the risk of private key or seed phrase leakage due to malware infection on a user device (e.g., phone) by ensuring that the private key generated by the Tag is never exposed to the device's operating system or stored in device memory. The tag is operable to generate cryptographic signatures internally, such that the private key remains isolated from any device that may be connected to the internet and potentially infected with malware. The system further prevents the use of an asset tool generated seed phrase from being exposed to malware by requiring all cryptographic operations for authentication to be performed within the secure environment of the tag.

In some aspects, the method can enhance security for user-initiated actions by requiring that any request for action from third party representatives be authenticated through a digital signature generated using a dailyKey (ECDSA) associated with those representatives. This approach is specifically designed to prevent a malicious actor from impersonating a legitimate representative and initiating unauthorized actions. To further safeguard against unauthorized access, the user's mobile phone is configured to verify each received digital signature by comparing it against a list of authorized representatives maintained on a smart agreement (e.g., such as a smart contract). This verification process ensures that a malicious actor cannot use an unauthorized signature to perform account actions. Additionally, the mobile device (e.g., phone) will only permit the requested action if the digital signature is both valid and corresponds to an authorized representative as indicated by the smart agreement. This mechanism effectively blocks attempts by a malicious actor to execute fraudulent exchanges (e.g., which can be considered a transaction throughout this disclosure). As an added layer of protection, the mobile device (.e.g, phone) is also configured to alert the user if a received signature does not match any entry in the list of authorized representatives. This alert system helps prevent fraudulent activity by promptly notifying the user of any suspicious or potentially malicious attempts to access.

Additionally, the system may use cryptographic permissions and include a feature for detecting and alerting the user if the mobile phone used to interact with the tag is determined to be compromised by malware, thereby preventing authentication or access to the blockchain-based service until the mobile phone is secured. The system is further configured such that, even if a mobile phone is infected with malware, the private key and seed phrase remain secure and inaccessible to the malware due to the cryptographic isolation provided by the tag. In some embodiments, the system is operable to restrict the use of hot wallets for authentication purposes, and instead mandates the use of hardware-based tags to minimize the risk of credential leakage through malware. These features collectively provide a robust security framework for blockchain-based user identification and authentication, particularly in environments where malware threats are prevalent.

A system is disclosed that can use cryptographic permissions for decentralized validation and transparency of the blockchain in the real world using a device that connects and serves as a connector between the real world and the blockchain comprising a Tag2FA passive NFC card comprising:

- a PCB (Printed Circuit Board) used as the main part in the construction of electronic devices;
- a Chip allowing the storage of asymmetric keys, one public and one private, wherein the private key is used for encryption; and wherein the public key is used for decryption or signature, without being able to infer from each other. The signature uses a private key in a digital signature algorithm that uses elliptical curves to verify identity in a safe and efficient way (ECDSA curve). The signature can be decrypted using the public Key within the blockchain independent of an external server.

NFC antenna embedded in the PCB enabling communication between an external NFC reader and the chip, sending commands, wherein the inscription creation of the Keys in the Chip is done randomly and the decryption may be done in the blockchain, then signed using a private Key without exposing it. The magnetic field and the resonance created by reader's contact with the antenna, enabling the chip to be activated passively without the need for an external power source. The antenna is tuned to a frequency accurately correlate with the RF field of the reader;

a Capacitor C that stores energy in the form of an electric field and is used for filtering, smoothing, charging/discharging or separating signals in circuits and adjusting the resonance circuit (LC) so that the resonant frequency corresponds exactly to the accuracy of communication between the antenna and the chip.

A mobile application configured to generate ECDSA signatures using a dailyKey. As used herein, systems and methods can generate and/or utilize any number of signature types, including any known "digital signature", such as ECDSA as well as any cryptographic value generated using a private key and verifiable using a corresponding public key, such as those produced in accordance with ECDSA or other signature schemes now known or later developed. Unless otherwise specified, references to a signature herein encompass any such cryptographic authentication mechanism suitable for blockchain or distributed ledger systems.

A verification module for comparing signatures against an authorized smart agreement (e.g., a smart contract), wherein both the user and the service representative can mutually verify each other's identities over a non-secure communication channel such as a phone call.

Other features and advantages of the invention will be apparent from the description, drawings and claims.

BRIEF DESCRIPTION OF THE FIGURES

FIG. 3—A table of the passive tags.

The present invention is illustrated by example and is not limited to the accompanying figures in which reference numbers indicate similar elements.

DETAILED DESCRIPTION OF THE PREFERRED EMBODIMENTS

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. It is understood that the phraseology and terminology employed herein is not to be construed as limiting and are for descriptive purposes only.

The present invention relates to the field of blockchain-based two-factor authentication (2FA) and Mult-signature that can use cryptographic permissions.

The present invention discloses a system and method for implementing the process of validation and transparency of the blockchain to physical services in the real world using cryptographic permissions.

Figure 2:
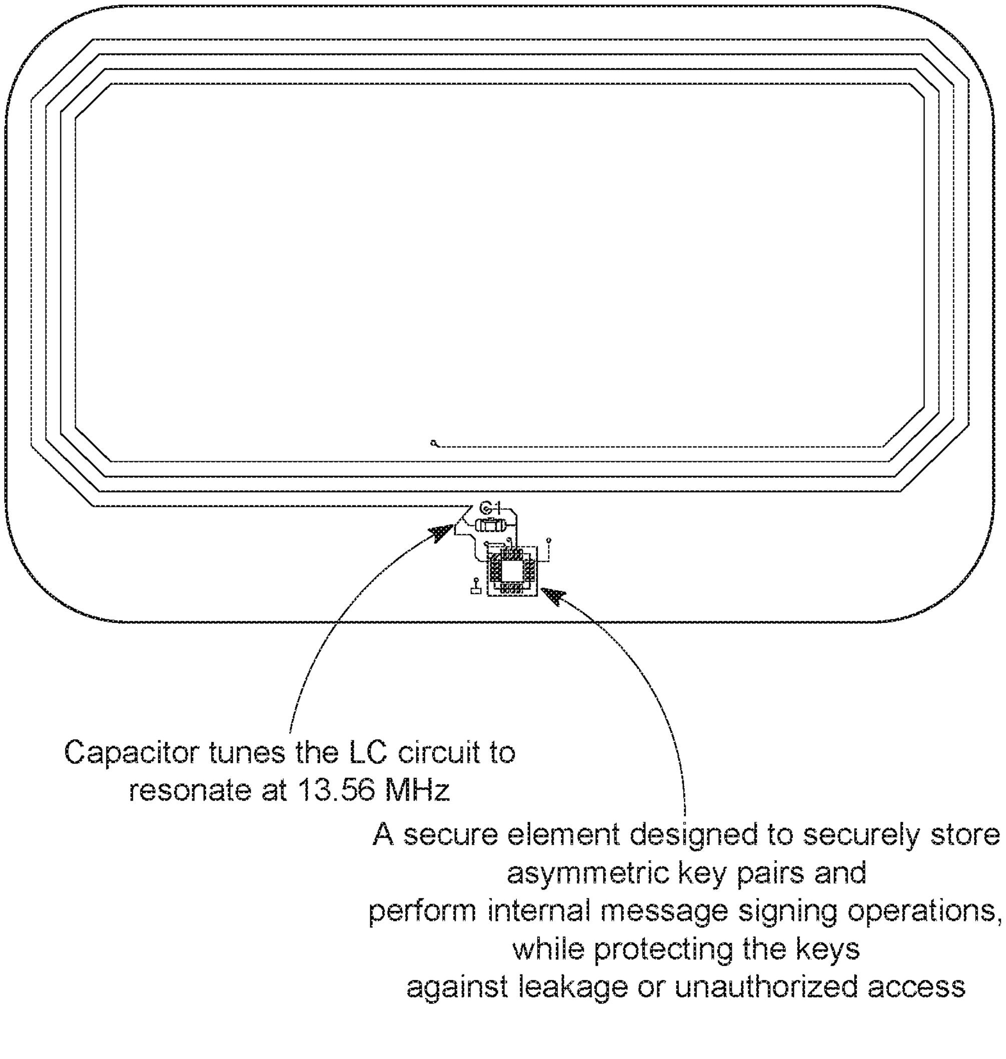
FIG. 2—An illustration of theTag2FA.

Another goal of the disclosed invention is to serve visual cards like disability certificates, as illustrated in an example of FIG. 2).

Another goal of the disclosed invention is for accessing and serving online via daily Key, as illustrated in an example of FIG. 3).

The system discloses a method to enjoy the decentralized validation and transparency of the blockchain in the real world using a device that connects and serves as a connector between the real world and the blockchain, as illustrated in an example of FIGS. 2, 3, 21, 22).

The device is a Tag2FA passive NFC card (hereinafter referred to as the "Tag") that works with four basic components. It does not need an internal or external power source, as illustrated in an example of FIG. 2).

The Tag comprises:

A PCB (Printed Circuit Board) is a printed board on which electronic components and electrical circuits are mounted and used as the main part in the construction of electronic devices. It comes in any shape and size, from an 80 mm×50 mm credit card (such as the Tag) to the format of a small sticker with a diameter of 30 mm (like currency).

Chip (e.g., secure element/secure curve Apple) allowing the storage of asymmetric keys, (a pair of cryptographic keys), one public and one private, wherein the private key is used for encryption. The public key is used for decryption or signature, without being able to infer from each other. A signature using a private key in a digital signature algorithm that uses elliptical curves to verify identity in a safe and efficient way (ECDSA curve). The signature can be decrypted using the help of the public Key within the blockchain independent of an external server.

"On Chain" describes a system or operation that is performed entirely on the blockchain network including logic, data, and authentication, without dependence on external servers or off-chain processes.

NFC antenna—a metal coil embedded in the PCB that enables communication between an external NFC reader, (like, a cell phone, a reader device connected to a computer), and the chip, sending commands.

For example, writing secp256k1 pair keys, meaning, an asynchronous encryption method that includes a private key for signing data and a public key for decryption of said encryption. The same encryption that known blockchain networks like Bitcoin/Etherum/BSC/Solana/Tezos, etc., use on the blockchain.

The advantage in the system is that the inscription creation of the Keys in the Chip is done randomly and the decryption may be done in the blockchain, then signed using a private Key without exposing it.

In addition, with the help of a magnetic field and the resonance created by reader's contact with the antenna, the chip can be activated passively without the need for an external power source (e.g., battery).

Capacitor C (a component that stores energy in the form of an electric field, and is used for filtering, smoothing, charging/discharging or separating signals in circuits). The antenna must be tuned to a frequency of 13.56 MHz to accurately correlate with the RF field of the reader, which is of the same frequency, otherwise there will be no sufficient inspiration for the operation of the secure element/curve, or for proper data transmission. Different frequency will result in power losses, shorter range, and unreliable or completely failed communication.

Capacitor C is used to adjust the resonance circuit (LC) so that the resonant frequency corresponds exactly to 13.56 MHz, which maximizes the transfer of energy and the accuracy of communication between the antenna and the chip.

The Tag's Crypto Strength Vs. The Alternative

Figure 1A:
FIG. 1*a* and FIG. 1*b*—a picture of a cold wallet.
Figure 1B:
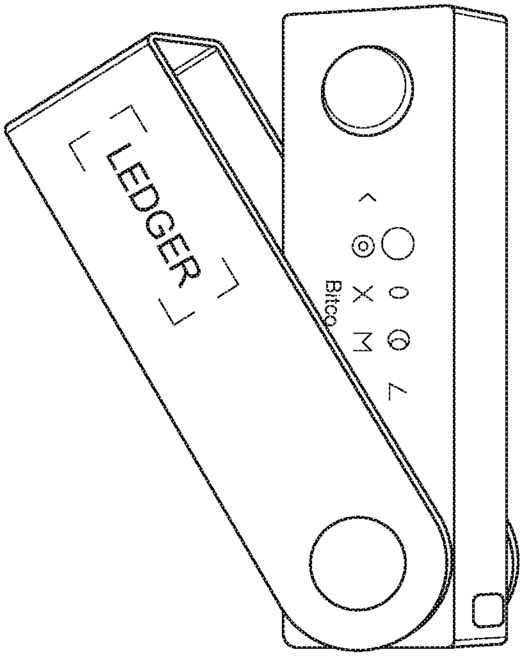

Hot Wallet—To communicate with the blockchain, a crypto asset tool needs to be opened. The asset tool allows communication with a smart contractor via the blockchain and store cryptocurrencies or NFTs (Non-Fungible Token), as illustrated in an example of FIGS. 1*a* and 1*b*).

A non-Fungible Token is a unique token on a blockchain that represents a unique digital asset, such as a work of art, other collectibles or a certificate of ownership.

In order to open a new asset tool, there are digital asset tool services (MetaMask, Rainbow) through which the asset tool can be opened. This method is called a "hot asset tool". When creating a new asset tool, the digital asset tool creates a unique pair of asymmetric keys.

PrivateKey is the "password" for the asset tool. For recovering a crypto asset tool the PrivateKey, (64 hexadecimal characters (hex)=32 bytes=256 bits), must be written in the digital asset tool service and this is how it recovers the asset tool. An example of PrivateKey:

"5917368f972be846320cde419f2f897b8aB56cA33c9e12 1a31073c11 b96ba0dd"

Since it is not a readable and an easy to remember format, the digital asset tool service provides the users with a more readable configuration of the PrivateKey that represent it in a 12-24-word format (seed phase/mnemonic phrase) from a list of 2048 fixed words (BIP-39). For example:

"Zoo Bar Radar Black Tree Maple Onion Echo, Museum Armed Curtain Finish".

By the seed phase the same asset tool address can be restored as done with PrivateKey, but this is a more readable format, so most of the time the asset tool recovery is done using the seed phase.

This is where a well-known problem in the crypto field starts. Since the seed phase serves as a "password" for the asset tool, anyone who has the exact sequence of words for the asset tool can restore it and empty its assets (cryptocurrencies, NFTs, or other assets).

The method of digital asset tool services is called a "hot wallet" in crypto parlance, because it is connected to the internet. Even if the seed phrase is stored on an offline page, once it is used to open the asset tool through a device connected to a network, there is a potential risk of leakage, especially if the asset tool created the seed phrase for the user or if the device is infected with malware.

Since hot asset tools may contain high-value assets, they are considered more exposed, and investors, who prefer maximum security, prefer to use a "cold asset tool". A cold asset tool is a solution where private keys are stored out of a network connection, usually dedicated hardware is used, as illustrated in an example of FIGS. 1*a* and 1*b*.

The dedicated hardware is a physical device that is not connected to a network and is built around a Secure Element chip, similar to the passive tag. The chip generates the seed phrase locally and securely, without exposing it to the Internet or any external device, making sure that the seed has not leaked out.

Afterwards the cold asset tool can be connected to a dedicated software program on a computer or cellphone using a local connection (USB or Bluetooth), and secure signatures. So, the private key never leaves the chip, and communication with the blockchain is carried out without the risk of the keys being exposed.

Today, a cold asset tool is mainly used for:

Personal use—Crypto investors, who hold high value assets prefer to use a cold asset tool to protect their private keys from hacks and leaks.

Institutional Use—Crypto companies such as exchanges or trust services, who transfer valuable assets, use cold asset tools as part of a security mechanism called multi-signature (MultiSig).

The use of a cold asset tool is considered the best security solution in crypto, but it has several significant disadvantages:

High cost—Cold asset tools such as Ledger, Trezor or Tangemusually cost between 40$ to 400$, which deters new users or small investors.

Seed Phrase dependency—Even though the device is secure, the seed phrase is still required to be backed up and stored. If it is forgotten, lost, or stolen, all access to assets is permanently lost.

Difficulty in operation—Cold asset tools require some knowledge, which makes them less accessible to the public who are not crypto-savvy.

To make the process of validation (cryptographic verification) of the blockchain world accessible to the average person, it is necessary to have a simple, clear and inexpensive device, as illustrated in an example of FIG. 2.

The device has the following advantages:

The use of passive NFC allows for a very simple user experience. All that the user must do is attach the card to the reader and there is no need to operate, charge or plug in.

Cheap and replaceable—in the event of loss, theft, or malfunction, it can be replaced quickly and without compromising assets or service availability.

The Tag generates a private key in a random and secure manner, like a cold asset tool, but unlike traditional cold asset tools, it does not reveal the private key to the user at all, which eliminates the risk of key leakage due to improper storage of the seed phrase.

Thanks to the low price and simplicity, replacing a Tag in the event of theft or malfunction does not constitute a barrier, which makes the solution accessible, secure and practical for the user.

Figure 21:
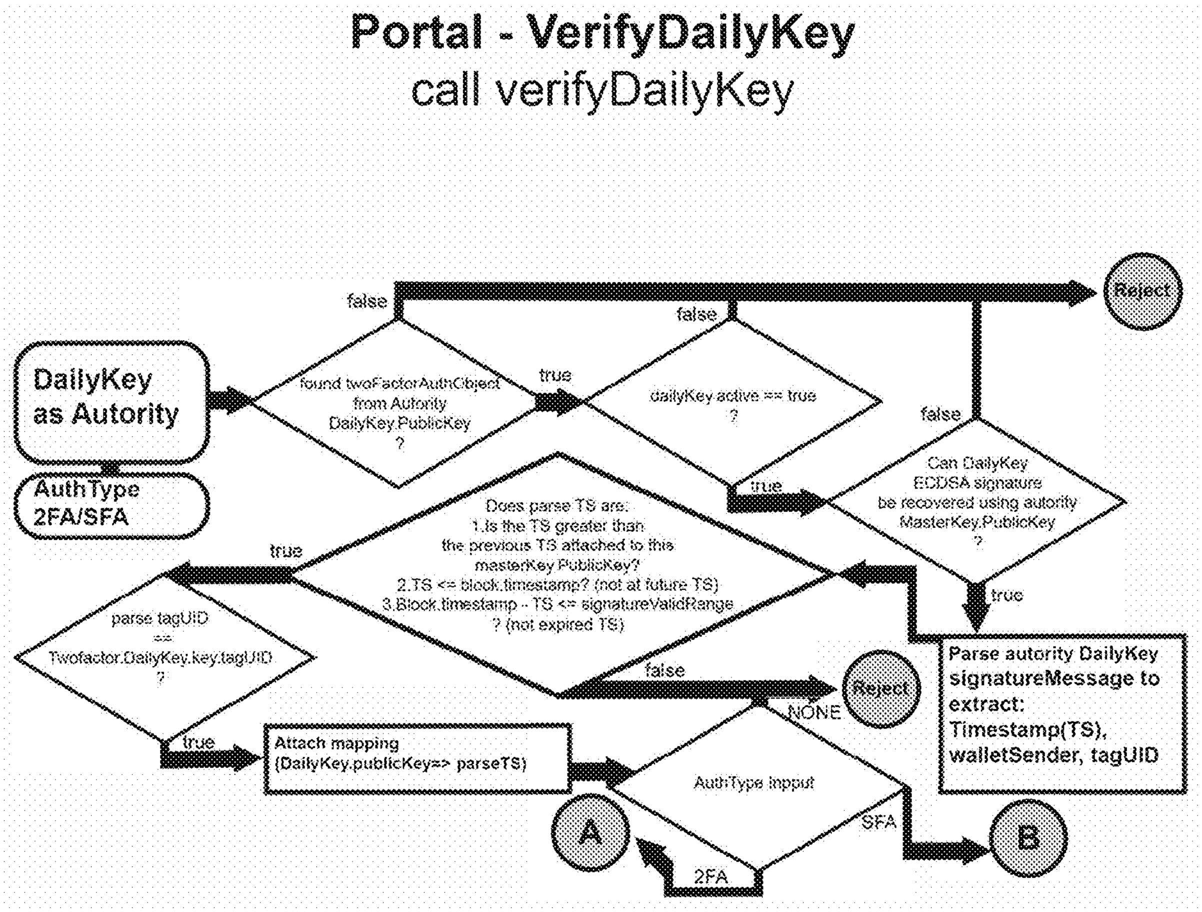
FIG. 21—shows a flowchart of Portal—VerifyDailyKey call VerifyDailyKey.
Figure 22:
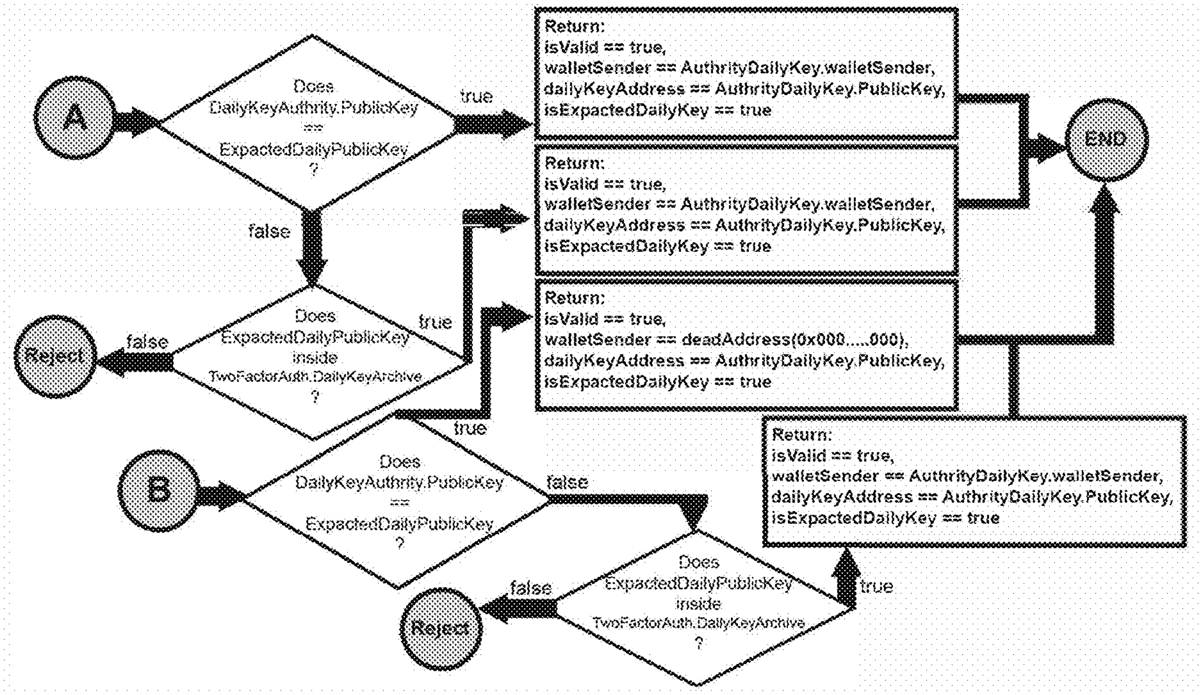
FIG. 22—shows a continuous flowchart of Portal—VerifyDailyKey A&B call VerifyDailyKey.

Having a secure, simple, and inexpensive physical device needs a blockchain mechanism that knows how to authenticate signatures created by it and integrate it as part of a two-factor authentication (2FA) process, as illustrated in an example of FIGS. 21 and 22.

Biometric Digital Identity System—Conceptual

A global digital identity system that aims to Create a unique digital identity for every human being based on iris scanning, to serve as "proof of personhood." The system allows users to obtain:

A Digital ID—a unique, encrypted digital identity.

A crypto asset tool to send/receive digital tokens.

How does the registration process work?

1. The user visits a physical biometric scanner device—an iris scanning terminal.
2. The device scans the iris and generates a secure "BiometricCode" (the actual iris image is promptly deleted).
3. Central servers check if the BiometricCode already exists to prevent duplicate identities.
4. If not, a new Digital ID is created and stored centrally.
5. The user gets access to a crypto asset tool app linked to their Digital ID.

Important: The BiometricCode cannot be deleted once created—if it were deleted, the proof of uniqueness would not work.

How are blockchain exchanges signed?

After registration, no further iris scans are needed.

Sending blockchain exchanges is done only via the asset tool app.

The identity is validated based on the user's access to the app—not by re-scanning the iris If a malicious actor steals the user's device, they can send exchanges in the user's name without any iris verification or biometric check at the time of exchange.

This means the Digital ID acts only as a one-time registration tool, not as an ongoing security layer.

A Secure Alternative to Centralized Global Crypto-Identity Systems, Enabled by My Invention:

1. Problem: No real-time biometric validation for exchanges—authentication happens through basic app access.

Solution: Physical presence required for every exchange via NFC tag (dailyKey). Even with crypto asset tool access, exchanges are impossible without the physical keyTag, as illustrated in an example of FIGS. 2, 3, 6, 7, 8, 9, 21, 22.
2. Problem: No real-time biometric validation for exchanges—authentication happens through basic app access.

Solution: Physical presence required for every exchange via NFC tag (dailyKey). Even with crypto asset tool access, exchanges are impossible without the physical keyTag.
3. Problem: Device compromise=identity theft—anyone with device access can impersonate the user.

Solution: Device theft protection—stolen phones are useless without the physical dailyKey. Attacker needs both crypto asset tool AND physical keyTag.
4. Problem: No recovery mechanism if biometric data is damaged—identity could be permanently lost.

Solution: Comprehensive hierarchical recovery system—lost/stolen tags easily replaced using backupKey or masterKey, like replacing a house key. No irreversible data loss, as illustrated in an example of FIGS. 3, 15, 16, 17, 18, 19, 20.
5. Problem: No user sovereignty—users cannot independently manage, backup, or transfer their identity Solution: Complete user control—full on-chain management to back up, transfer, revoke, reset, or logically delete keys. True digital identity ownership.

6. Problem: registration requires physical access to expensive Orb terminals.

Solution: Flexible distributed issuance—NFC tags can be mailed, dispensed at kiosks, or issued by partners. No specialized biometric infrastructure needed.

7. Problem: Privacy nightmare—permanent biometric data collection with regulatory violations.

Solution: Biometric-free design—completely eliminates privacy violations, biometric data regulations, and exploitation of vulnerable populations.

8. Problem: Security compromises—black market identity theft income.

Solution: NFC KeyTag cryptographic identity—IDs cannot be copied or sold without physical tag access. No central systems to hack or compromise, as illustrated in an example of FIGS. 4*a* and 4*b*.

9. Problem: Regulatory non-compliance—conflicts with GDPR deletion rights and data protection laws.

Solution: Full regulatory compliance—user-managed keys with genuine deletion capabilities ensure GDPR compliance and legal protection.

10. Problem: Expensive hardware prevents daily authentication—iris scanners cost thousands of dollars, making exchange-level biometric verification monetarily impossible.

Solution: Cost-effective daily authentication—NFC tags cost less than $10 each, enabling affordable per-exchange security that users can actually carry and use daily.

11. Problem: Bulky hardware unsuitable for daily use—iris scanners are too large and bulky to fit in phones or replace phone cameras, making portable authentication physically impossible Solution: Thin portable form factor—NFC keyTags are wallet-sized and can be integrated into cards, keychains, or other everyday items for convenient daily carry and use, as illustrated in an example of FIGS. 2 and 5.

Figure 40:
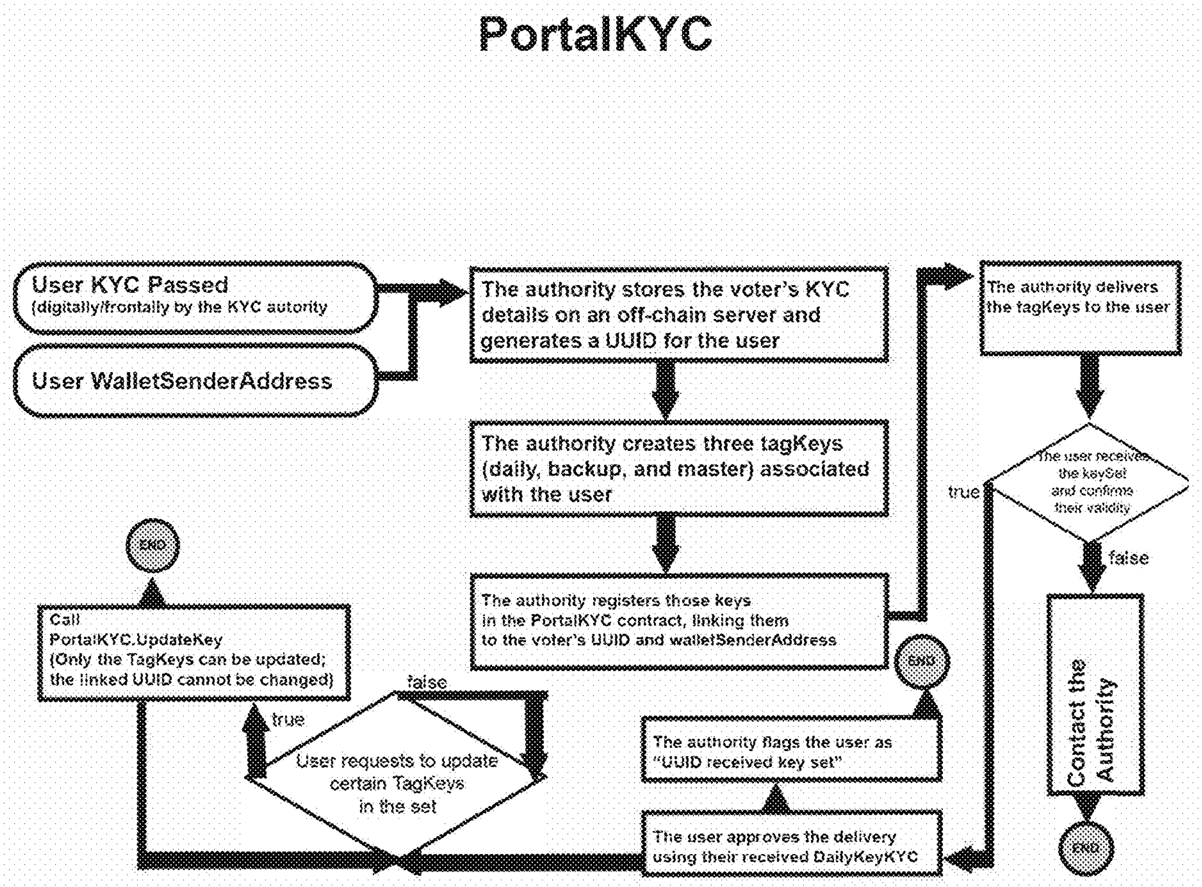
FIG. 40—shows a flowchart of PortalKYC.

Additional Capability: The system can optionally integrate offchain KYC verification linked to onchain KeySets, providing verified identity when required while maintaining cryptographic security and user privacy control, as illustrated in an example of FIG. 40)

To resolve the critical problem that anyone who holds the seed phrase can act on the user's behalf and perform irreversible actions in the crypto asset tool, a two-factor authentication solution (2FA) is needed.

Like the world of banking, where logging in to an account requires both a username and a password, as well as additional authentication using a one-time code sent to the phone (OTP), the same method is used in crypto.

A mechanism is required to verify that the action is carried out by a real owner who has two factors:

1. The Cryptographic (Wallet Crypto) Key (Seed Phrase/Private Key); and
2. Another physical device—such as the Tag, that is in user's possession, as illustrated in an example of FIG. 2.

Thus, even if the seed phrase is leaked, it is not possible to perform actions without the Tag, just as OTPpreventing access even if the password is exposed.

Today, two-factor authentication (2FA) is implemented on the blockchain network using the MultiSig method, in which each sensitive operation requires a signature from multiple keys (e.g., 2 out of 3). But in practice, this method requires the use of cold asset tools, which are expensive, cumbersome to operate, and require certain knowledge, which limits adoption among ordinary users.

Therefore, instead of using a cold asset tool as a second factor for authentication, the system discloses using Passive NFC, such as the Tag, as illustrated in an example of FIG. 2.

The new Portal (hereinafter "Portal") is a dedicated Smart agreement that defines the two-factor authentication (2FA) rules for the crypto asset tool.

An end user who wants to protect their crypto account with a physical NFC-based 2FA activates the security mechanism by calling the initialization (init) Register Set Keys in the Portal smart agreement, as illustrated in an example of FIGS. 6, 7, 8, 9.

Before reading, he must have 3 passive tags, each of which is defined in a different role in the system, as illustrated in an example of FIG. 3):

DailyKey—Daily Authentication (2FA)

This badge is always at the user's fingertips, and is required to confirm any critical action, such as:

Transfer of assets.

Signing agreements.

Change protocol settings.

Figure 38:
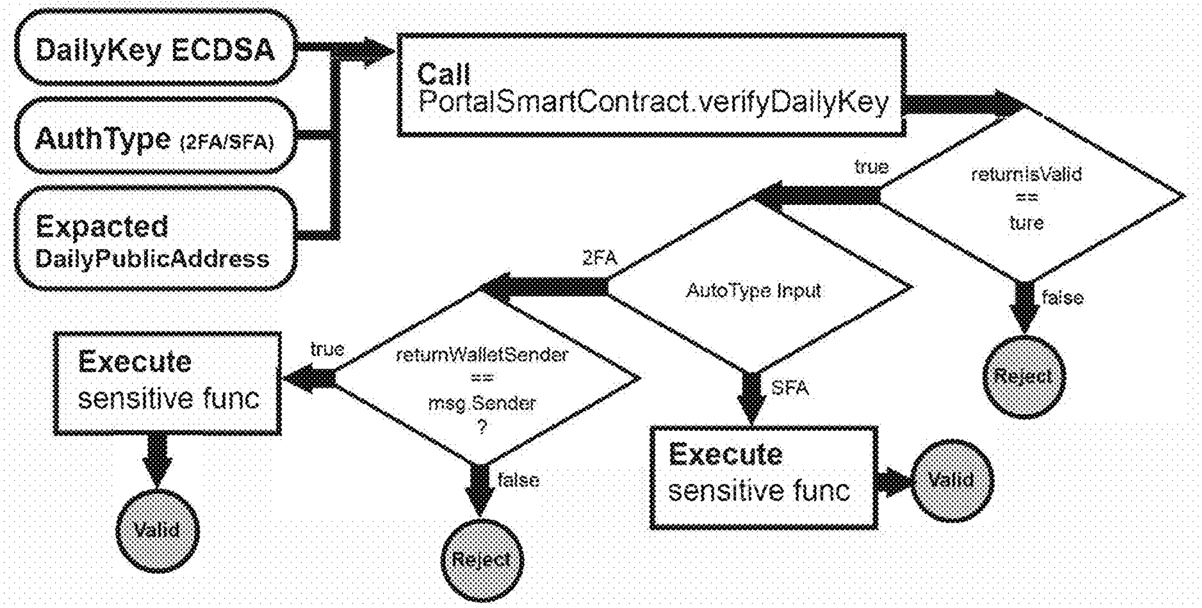
FIG. 38—shows a flowchart of Crypto-External Smart-Contract Integration with Portal protect sensitive actions.

For example, to transfer an NFT to another asset tool, as illustrated in an example of FIGS. 21, 22, 38, the user signs from his regular asset tool, and attaches an ECDSA signature from the DailyKey, which is verified by the Portal and proves that the user has both the asset tool's private Key and the physical NFC associated with it. This is a true 2FA on-chain certificate.

BackupKey—Dedicated Backup for Restoration or Replacement

Figure 14:
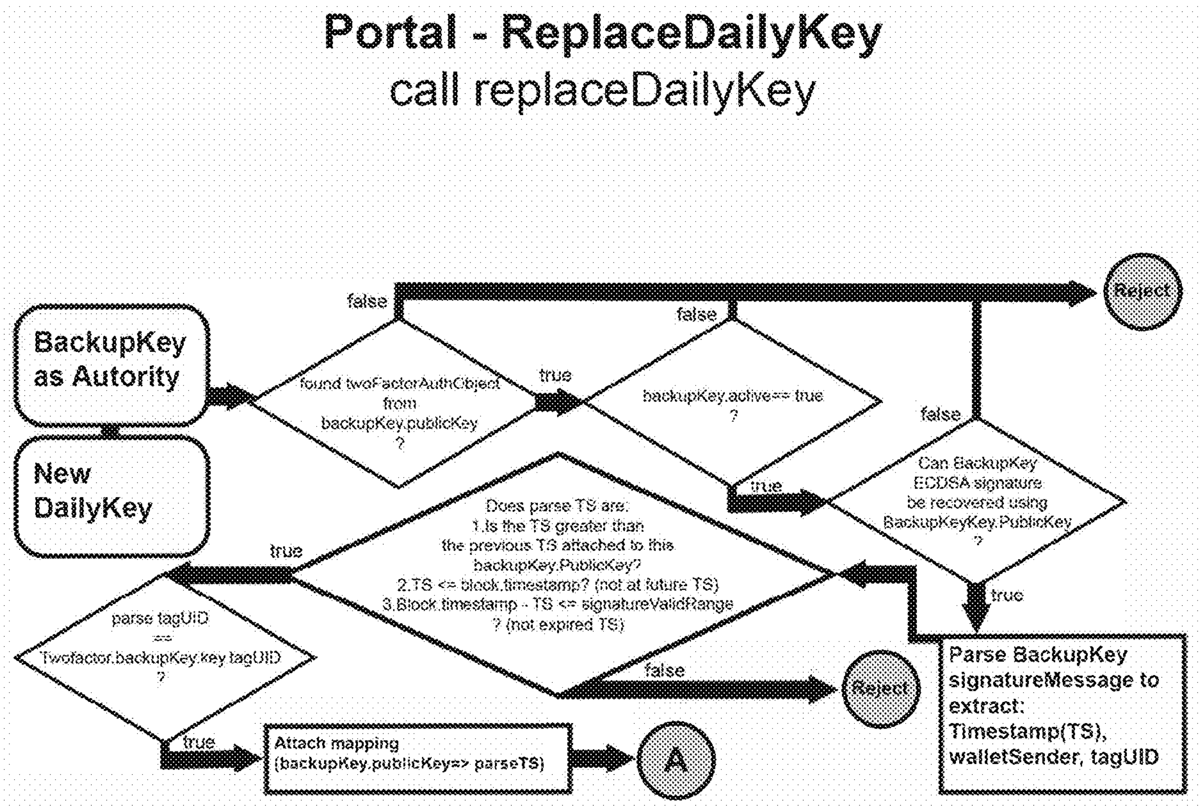
Figure 15:
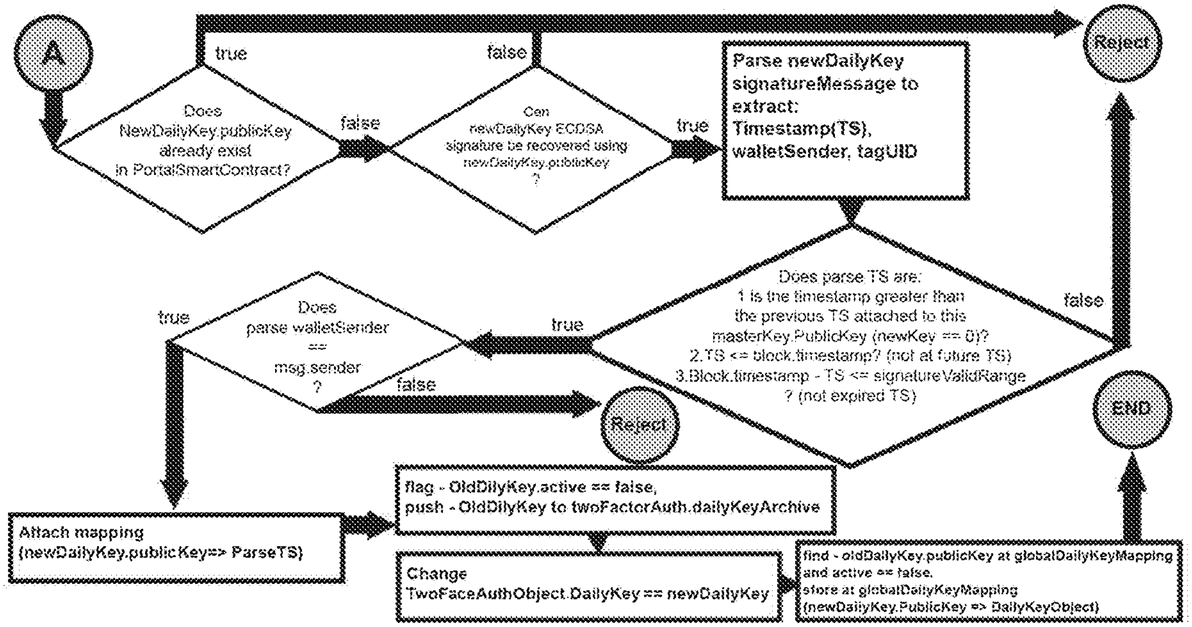
FIG. 15—shows a flowchart of Portal—ReplaceDailyKey A-call ReplaceDailyKey.

This badge is kept in a safe place (e.g. at home), and allows:

To cancel the DailyKey in case of loss, theft, or malfunction, as illustrated in an example of FIGS. 14 and 15.

To register a new DailyKey, only if there is a signature from the backup, as illustrated in an example of FIGS. 14 and 15.

This allows the maintaining of a high level of security even in failure scenarios.

MasterKey—Root Authority

Figure 16:
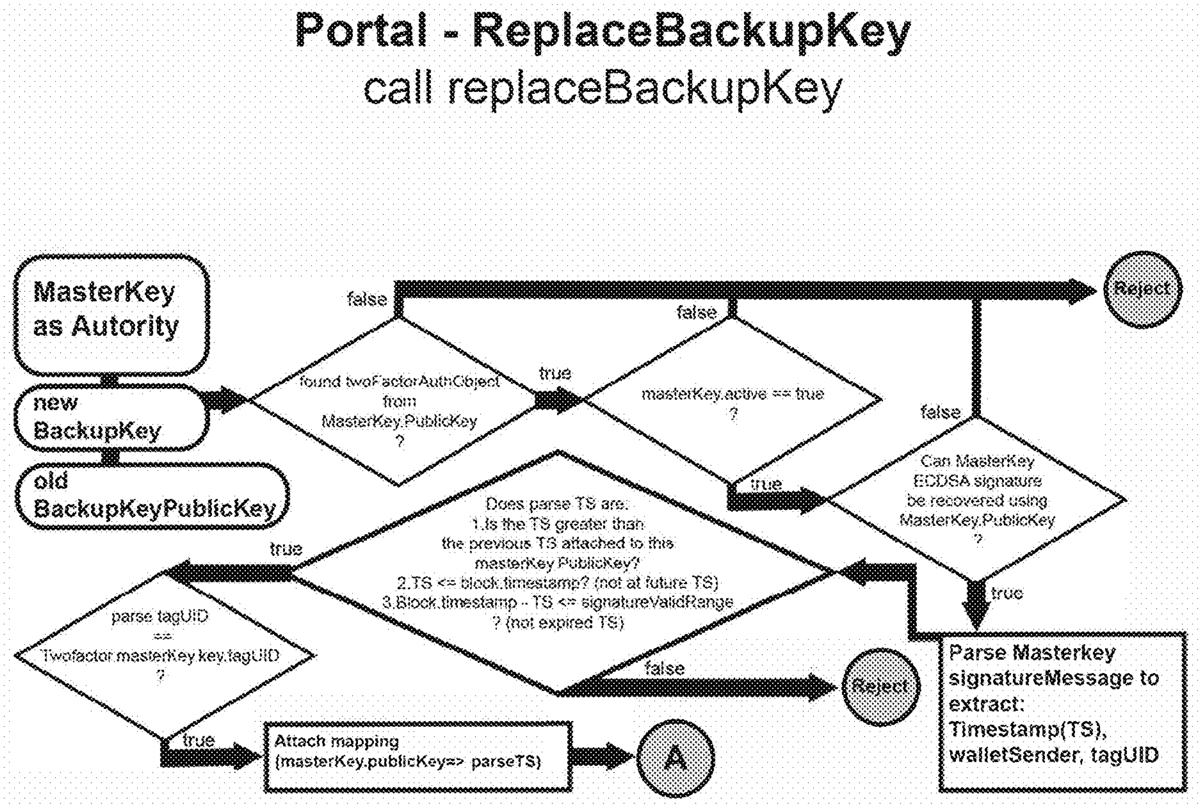
FIG. 16—shows a flowchart of Portal—ReplacebackupKey call ReplacebackupKey.
Figure 17:
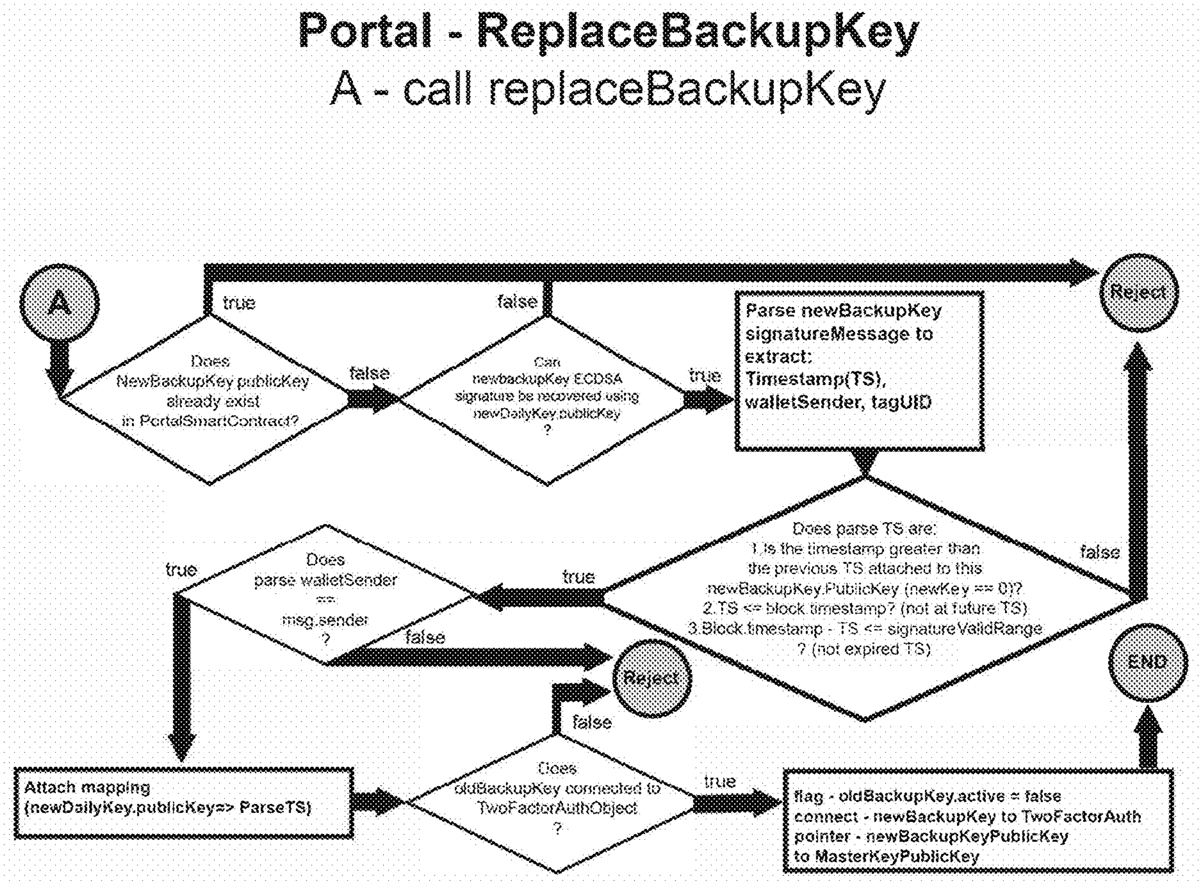
FIG. 17—shows a flowchart of Portal—ReplacebackupKey A-call ReplacebackupKey.

The Tag is kept in a highly secure place (e.g. safe) and is used for emergencies only. Allowing:

Restore or replace a Backup Key, as illustrated in an example of FIGS. 16 and 17.

Figure 18:
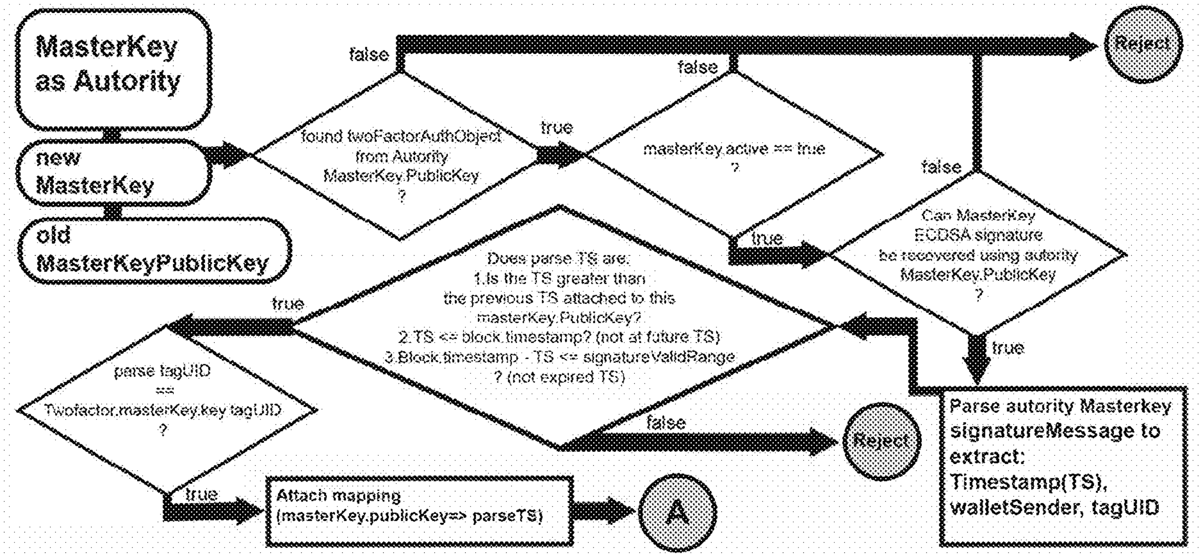
FIG. 18—shows a flowchart of Portal—ReplaceMasterKey call ReplaceMasterKey.
Figure 19:
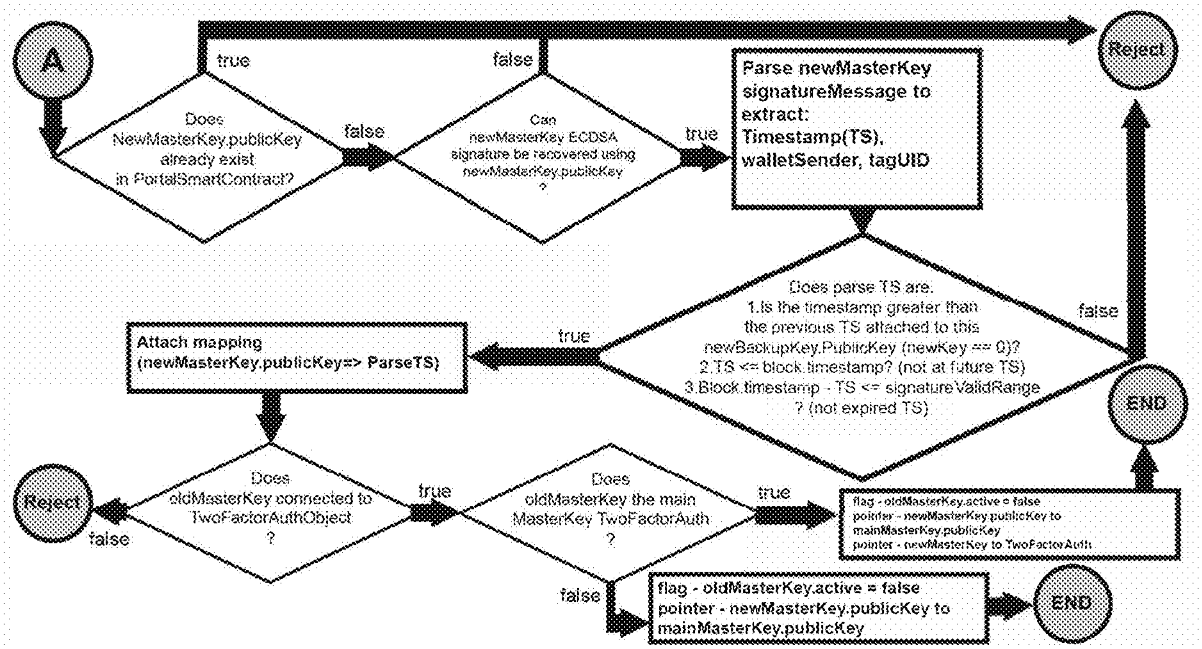
FIG. 19—shows a flowchart of Portal—ReplaceMasterKey A-call ReplaceMasterKey.

Restore or replace the Master Key itself, as illustrated in an example of FIGS. 18 and 19.

Figure 20:
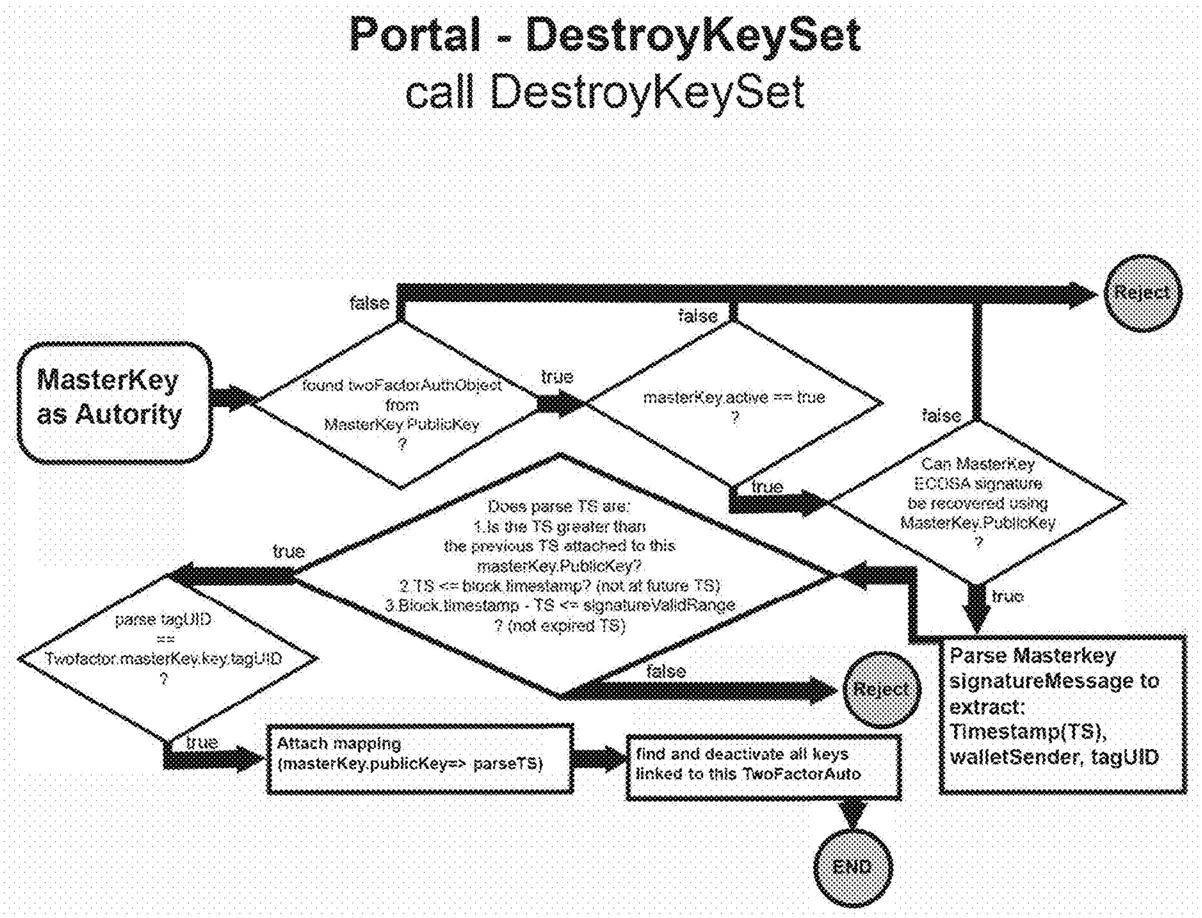
FIG. 20—shows a flowchart of Portal-DestroyKeySetMasterKey call DestroyKeySetMasterKey.

Erasing the entire key chain and starting over, in case of a serious malfunction or break-in, as illustrated in an example of FIG. 20.

Figure 10:
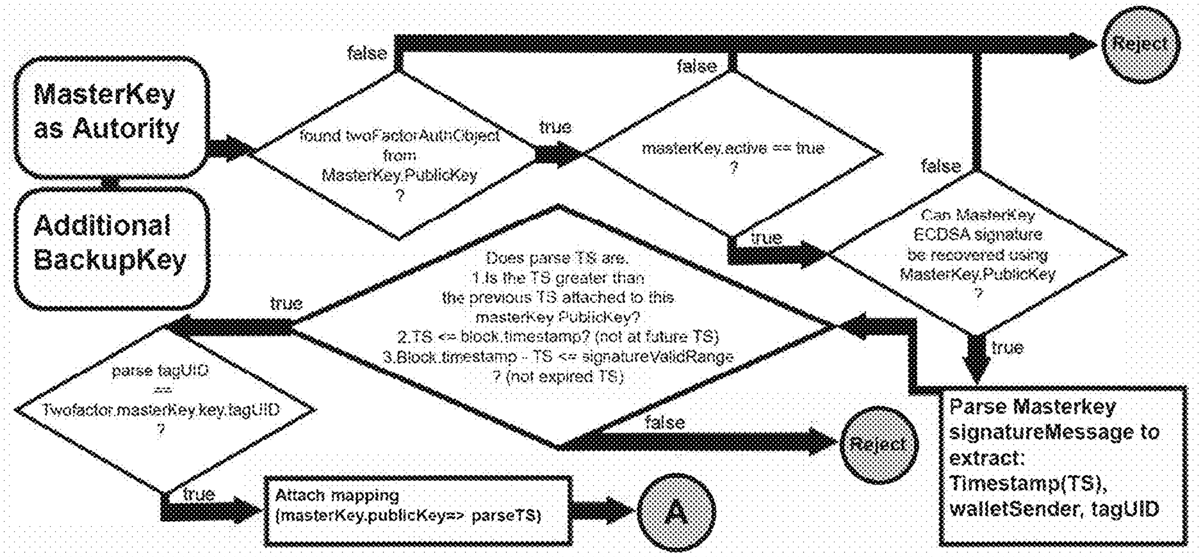
FIG. 10—shows a flowchart of Portal-AddMultipleBackupKeys.
Figure 11:
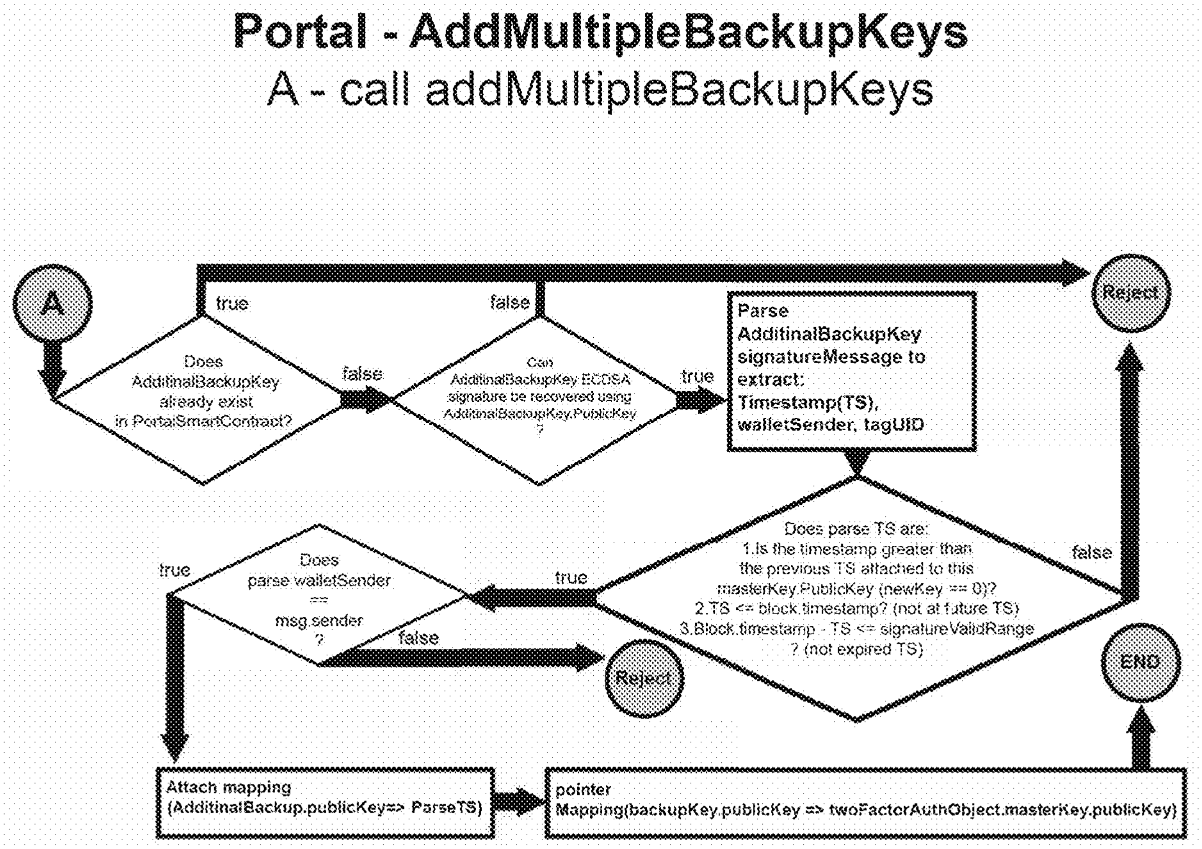
FIG. 11—shows a flowchart of Portal-AddMultipleBackupKeys A-call AddMultipleBackupKeys.
Figure 12:
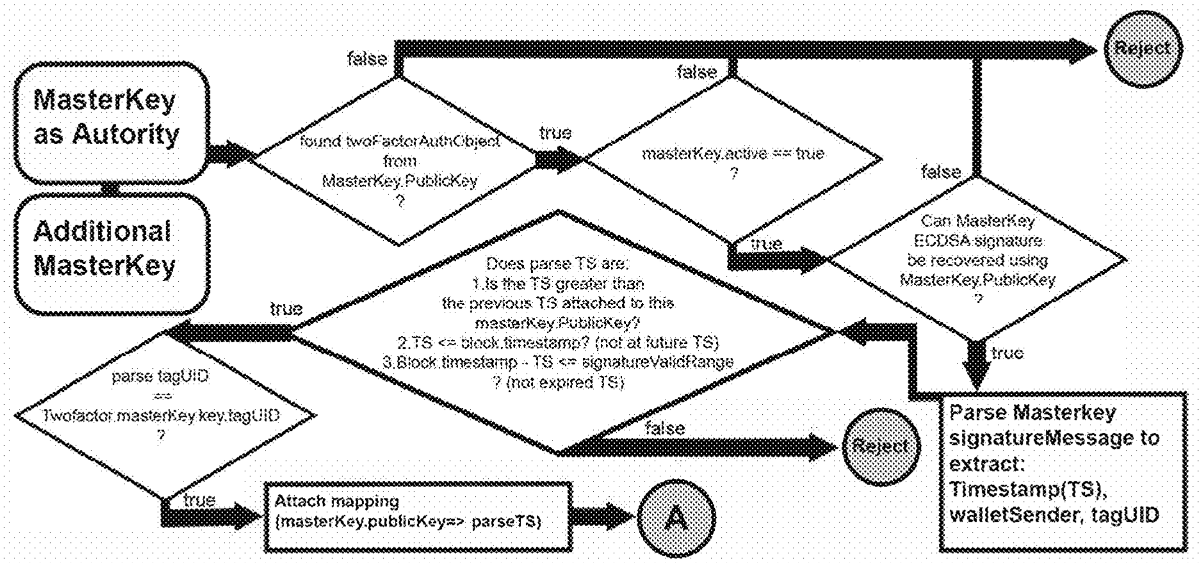
FIG. 12 shows a flowchart of Portal-AddMultipleMasterKeys call AddMultipleMasterKeys.
Figure 13:
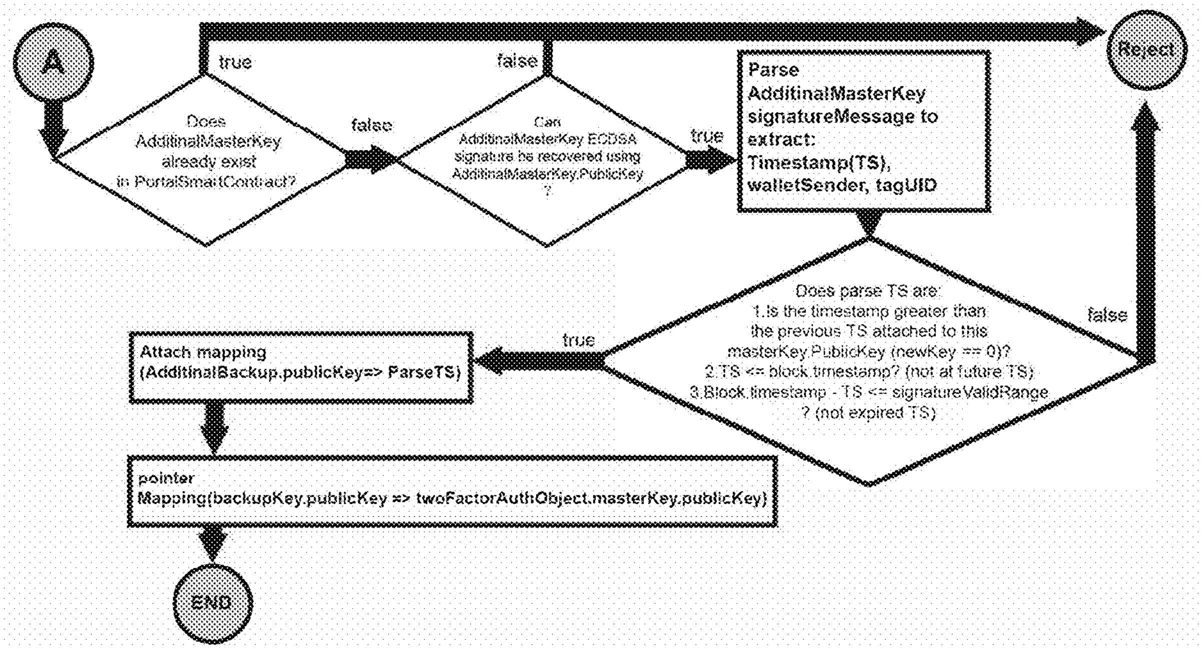
FIG. 13 shows a flowchart of Portal-AddMultipleMasterKeys A-call AddMultipleMasterKeys FIG. 14—shows a flowchart of Portal—ReplaceDailyKey call ReplaceDailyKey.

It is needed to have only one active dailyKey while backup, (see FIGS. 10 and 11), and master, (see FIGS. 12 and 13), allow several for backup, ensuring that only one authorized entity can ever authorize actions in real time.

Once a user has successfully set up his keyset in the Portal, sensitive actions in other agreements (such as an NFT agreement) can be linked to 2FA authentication against the physical Tag.

Figure 23:
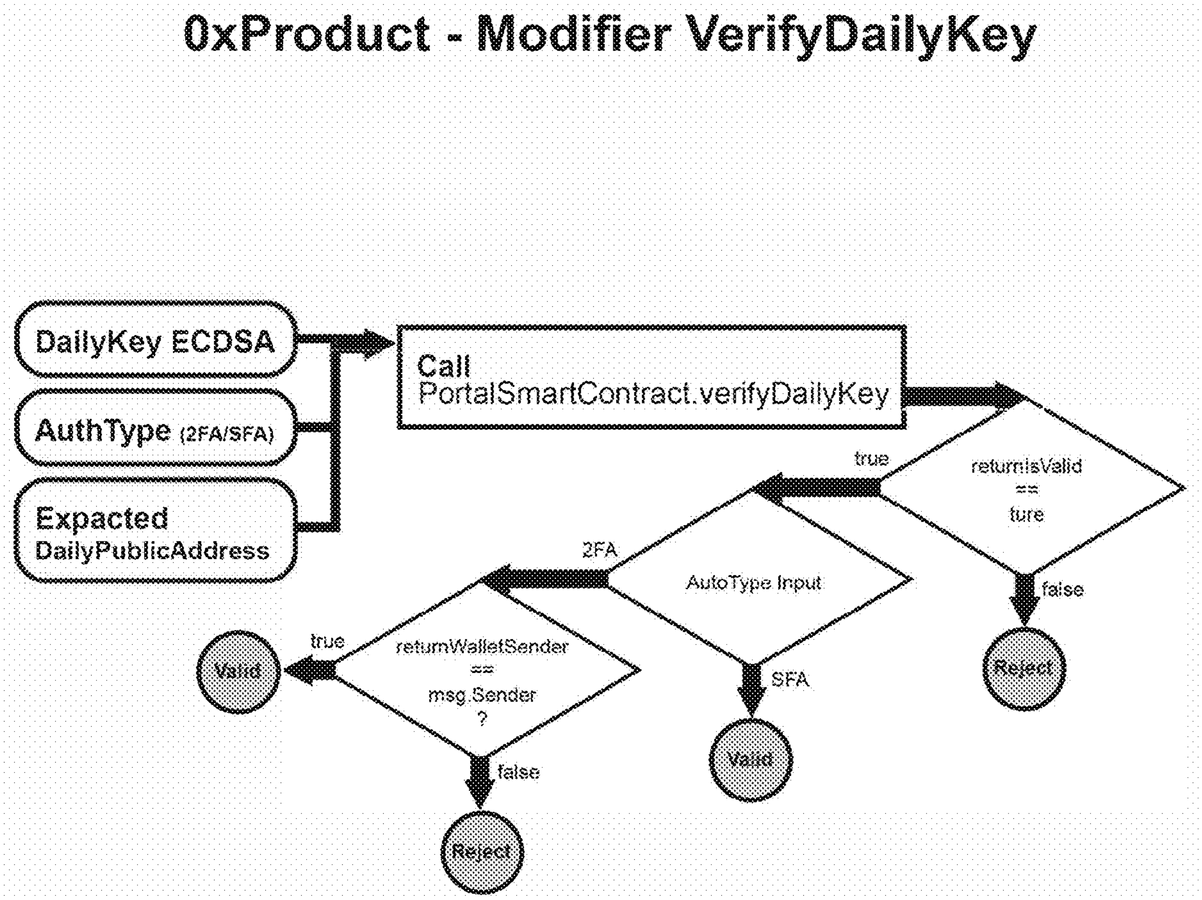
FIG. 23—shows a flowchart of OxProduct—Modifier VerifyDailyKey.

Instead of allowing a transfer based on just one signature from the asset tool, the NFT agreement requires a call to the function: PortalSmartContract.verifyDailyKey. This function checks that the operation has also been confirmed by the user's DailyKey, as illustrated in an example of FIG. 23.

The PortalSmartContract.verifyDailyKey function, as illustrated in FIGS. 21 and 22, receives the parameters:

String message—in the following format:

DailyPublicKey;

An ECDSA signature generated by the Tag on the same string message parameters format. (see FIGS. 4*a* and 4*b*.

Example of input to a function: ECDSA (message,r,s)

r:

0x35b51e4b4cbd22b807940af09637e3885c1eac0c98 9dfbd39f6b524d5c706d 2f s:

0x544abd7ff9555ef75c07c4ff781a6b21 eb8c0251887b3f5f06d019a9eb640e49 Message:

1752821290_0x8CC1 F9D204752CE4F4DA34CA9DECBEBD42F9746C_ 0x0000 0400500167A59B7CB97DOB045A8282062090

Tag Public Key: 0x8CC1 F9D204752CE4F4DA34CA9DECBEBD42F9746C

What Must be Checked:

that the signature can be decoded using the Public Key.

That the decryptor takes the timestamp and checks that the timestamp is within a range of x-seconds/minutes, (defined in the portal's smart agreement, which can be a smart contract), so that the signature is not in the past or in the future out of the range, (prevents signatures from being transferred for future use), and attaches the timestamp to (Tag) PublicKey in the blockchain so that it cannot be used twice.

that the timestamp of the current signature is greater than the last timestamp attached to Public Key. (Prevention replay attack of reusing the same signature).

that the Tag UID (unique identifier), from the decrypted signature corresponds to the UID attached to the PublicKey Tag when the Tag is inserted into the system preventing the creation of secp256k1 pair key using a known private key import and thus duplicating many same Tags, requiring the asynchronous keys to be issued randomly from the chip.

NET Smart agreement that calls to Portal Validation

The Smart agreement NET must verify that:

isValid==true sender Address==msg.sender

| description | Function return values |
|---|---|
| The public key address of the Tag verifying the operation. | Daily Public Key |
| Did all the tests pass successfully? | IsValid |
| In the event of a failure - a description of the reason (logic or security). | reason |
| The address that was withdrawn from the signature should be msg.sender (the user who called the function through the NFT Smart agreement). | Sender Address |

before executing a sensitive action such as transferring ownership of an NET.

All that has been explained so far, refers to new agreements.

Another problem arises connected to old NET or Crypto Token agreements. Once a smart agreement is deployed on the blockchain, its code is immutable. Therefore, it is not possible to retroactively add 2EA security mechanism (such as PortalSmartContract.verifyDailyKey) to existing NET or token agreements.

This is a severe limitation, especially for projects that want to improve security without reissuing the assets or moving users to a new smart agreement.

Figure 39:
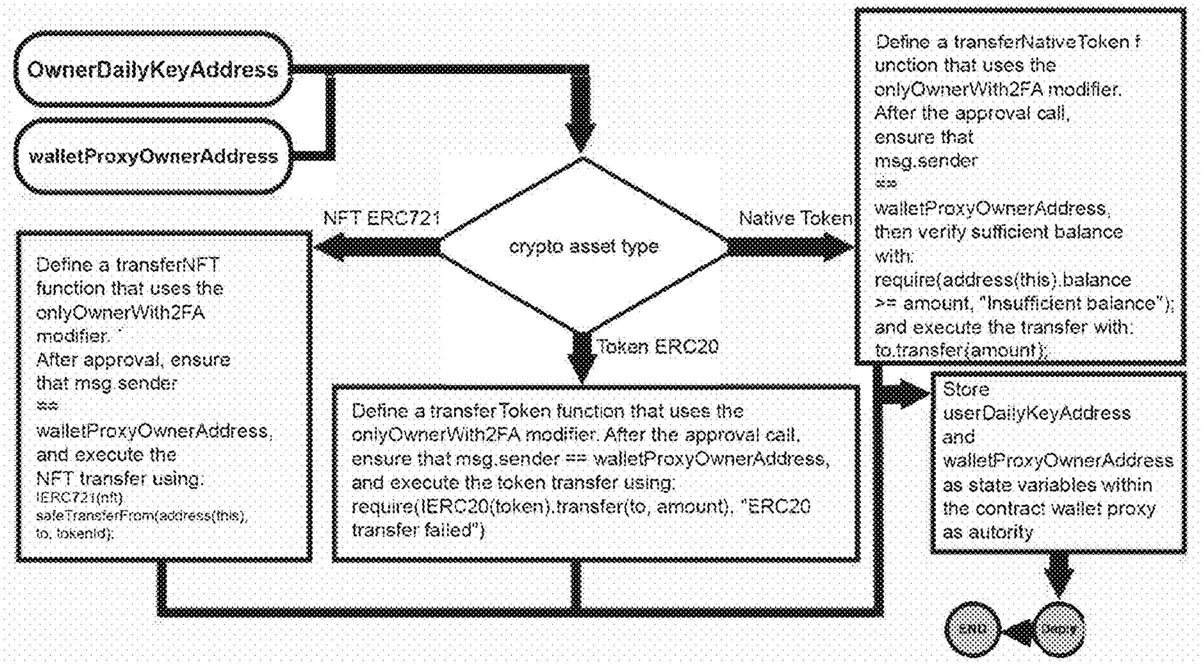
FIG. 39—shows a flowchart of Crypto-External Smart-Contract Integration with Portal protect sensitive actions using Deploy Contract Wallet (Proxy).

As part of the initRegisterSetKeys process, a personal Wallet Proxy, as illustrated in an example of FIG. 39), for the user is deployed, which is managed exclusively by the walletAddress defined in initRegisterSetKeys and includes the logic to securely transfer assets with authentication of the Portal. It can hold and transfer any asset, including old tokens or NETs that don't themselves contain 2FA verification, as illustrated in an example of FIG. 6).

In practice, the user sends assets to his personal wallet proxy smart agreement (NFT, ERC-20, ETH, etc.). When he wants to transfer them, he performs an action from within the proxy. The proxy calls PortalSmartContract.verifyDailyKey to verify that the user is holding the authenticated Tag. Only if the verification goes through, the asset is released and sent to the destination address.

A smart agreement, unlike a regular wallet, does not know how to transfer assets unless a clear logic is written to it. If there is a bug in the transfer logic, the assets may be stuck forever in the agreement. Therefore, it is crucial to make sure that the Code is clean, tested and safe, to perform comprehensive pre-release simulations and use tested libraries.

With this proxy, it is possible to add 2FA to old assets, without changing the original agreements, and give the user real and secure control over all his assets, at all levels of the ecosystem.

The Same System: Tag+Portal to Integrate Blockchain Validation with Physical Products, Services, and Real-World Interactions.

In the eyes of the public, crypto and blockchain are now perceived as a complex and closed world intended only for developers, NFT traders, or other users. But with the help of the Portal and the Tag, it is possible to take the core of the blockchain authentication, (ownership, history, and reliability) and bring it to physical products in the real world, in a simple, transparent, and accessible way, for example in luxury products:

Collectibles which includes sports cards, music, rare collectibles, art, branded clothing, toys, shoes, and more generates about $450 billion a year (as of 2023)[1].

In contrast, the counterfeit market generates an insane $1.023 trillion a year, more than twice the total collectible market. Counterfeiting impacts two main types of consumers:

1. Unsuspecting consumers—people who are interested in buying an original item but fall into the trap and acquire a counterfeit without knowing.

[1] https://univdatos.com/reports/collectibles-market

2. Conscious consumers—people who knowingly acquire counterfeit items just to look like they are wearing a brand, without paying the real price.

According to a survey conducted in April 2025 and published in the Counterfeit Buyer Teardown report, out of 2,000 clients of counterfeit products 46% acquired counterfeits accidentally, believing that it was an original product, 39% acquired fakes on purpose, just to look like they were holding the high-end product, and 15% reported a combination of the two cases, (sometimes knowingly and sometimes not).

Figure 5:
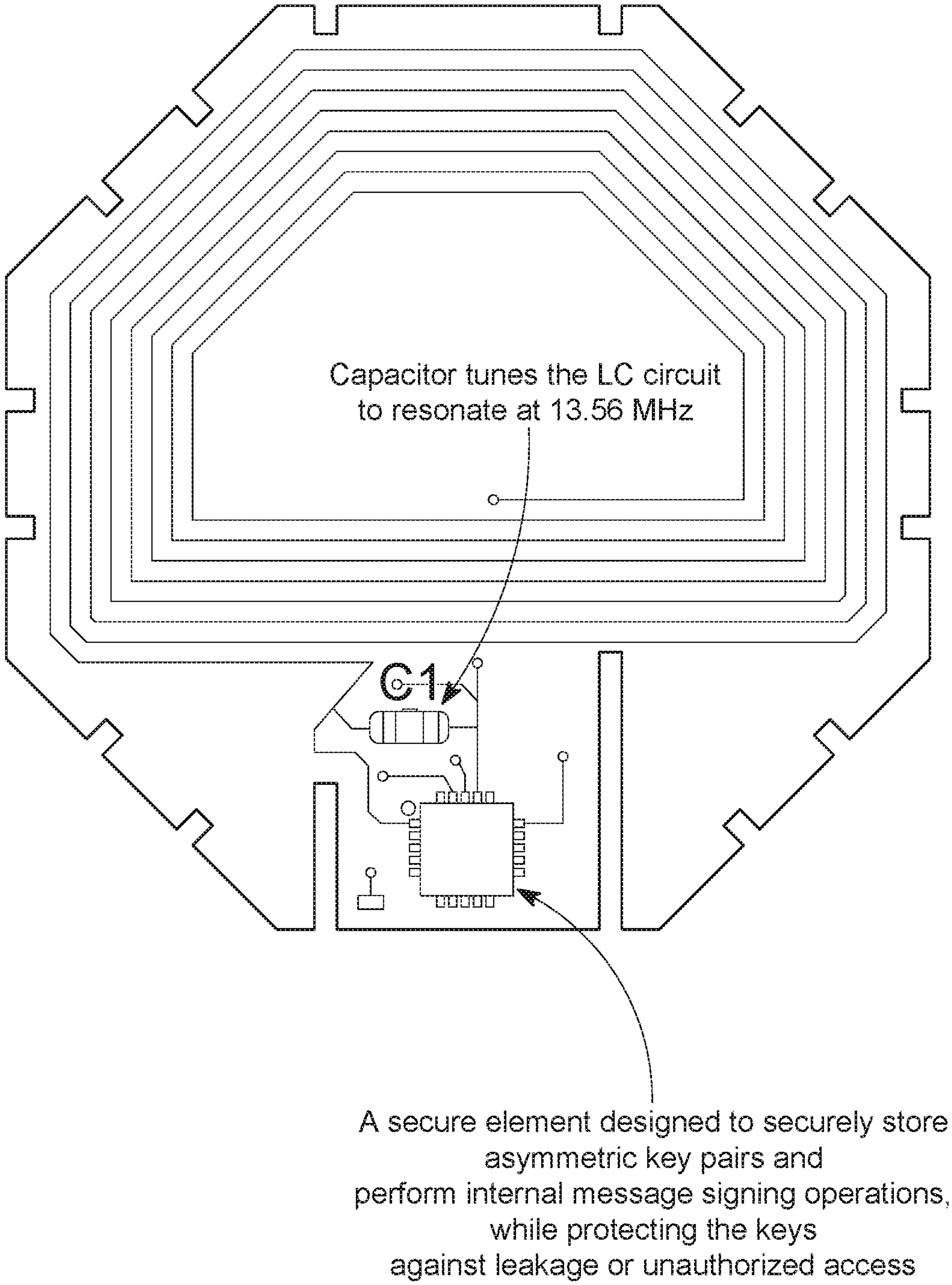
FIG. 5—shows an example of a TagSticker.
Figure 6:
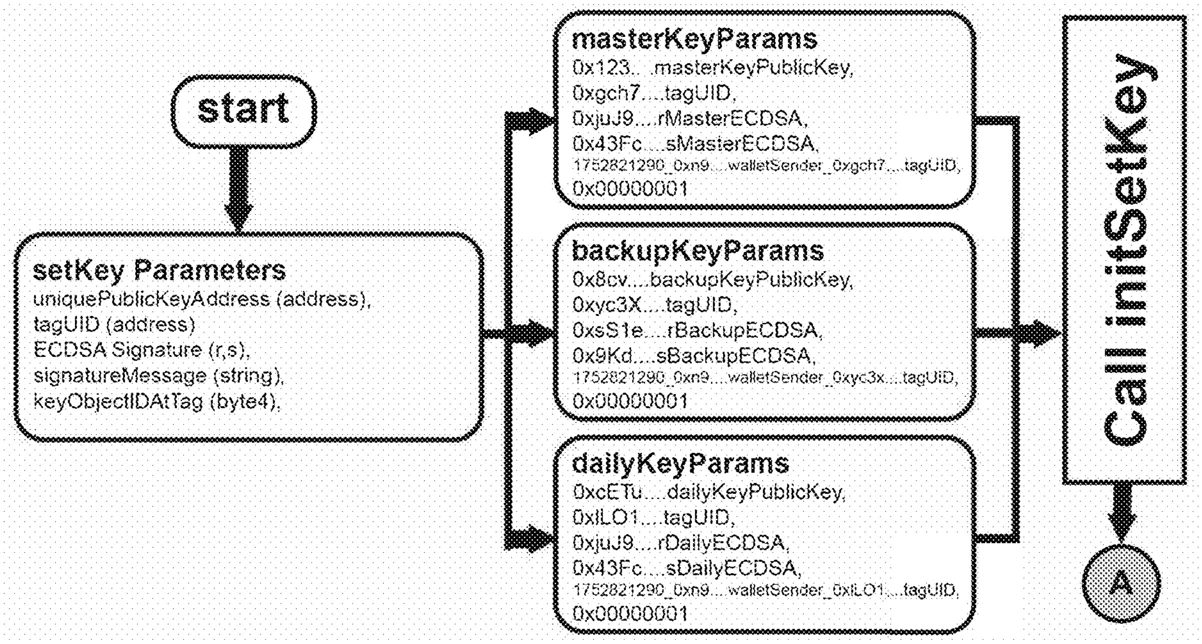
FIG. 6—shows a flowchart of setKey parameters (Portal—initSetKey).
Figure 7:
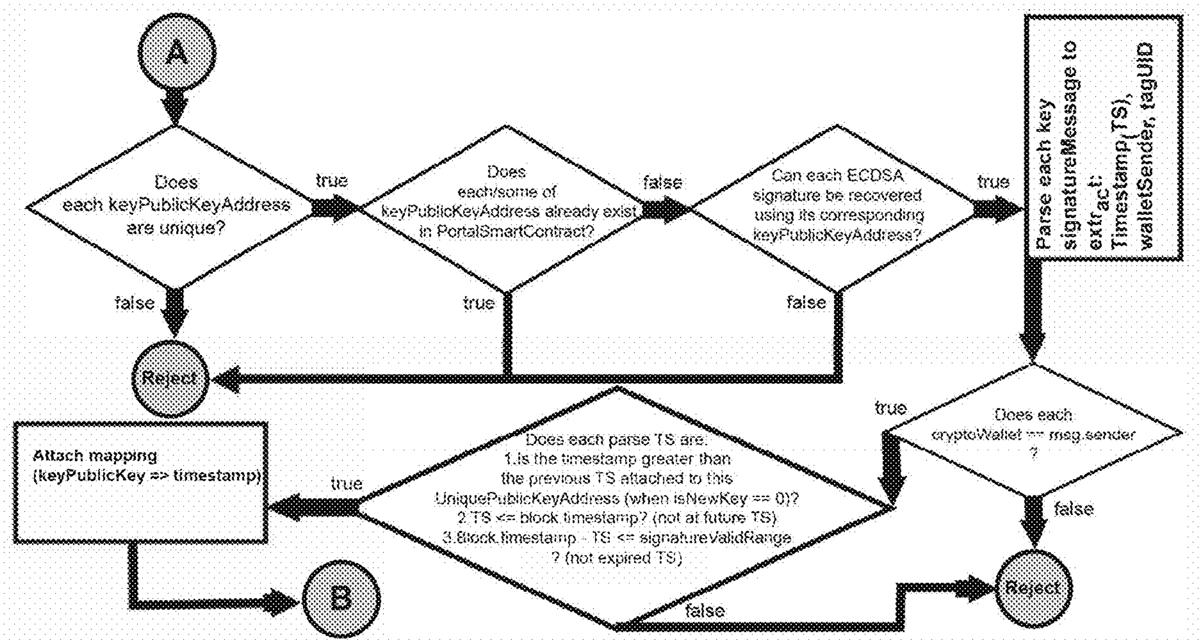
FIG. 7—shows a flowchart of A-call initSetKey(Portal—initSetKey).
Figure 8:
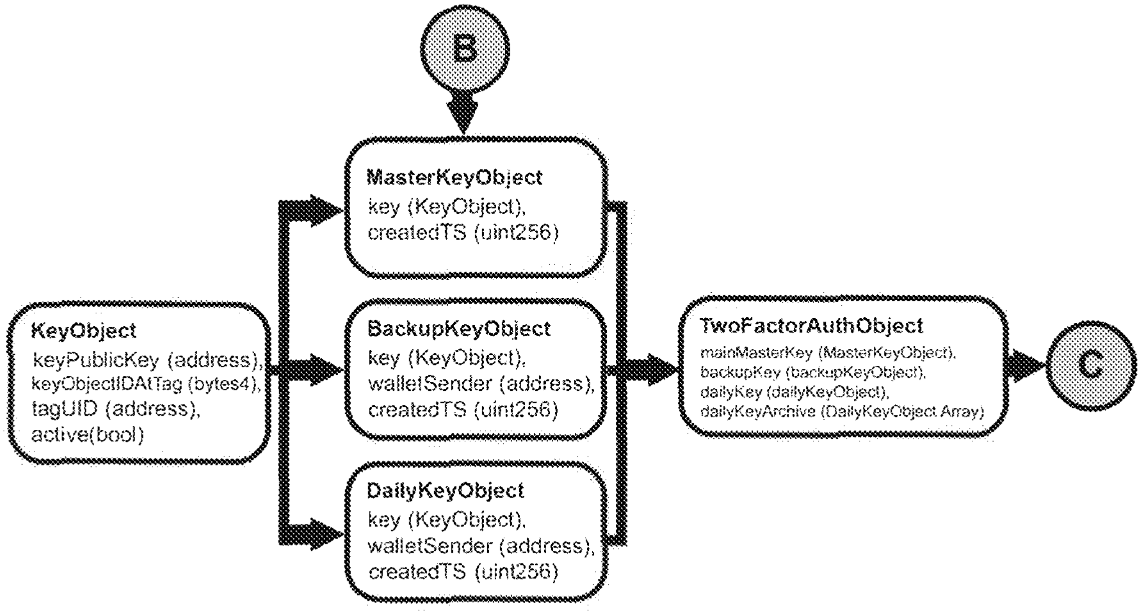
FIG. 8—shows a flowchart of B-call initSetKey(Portal—initSetKey).
Figure 9:
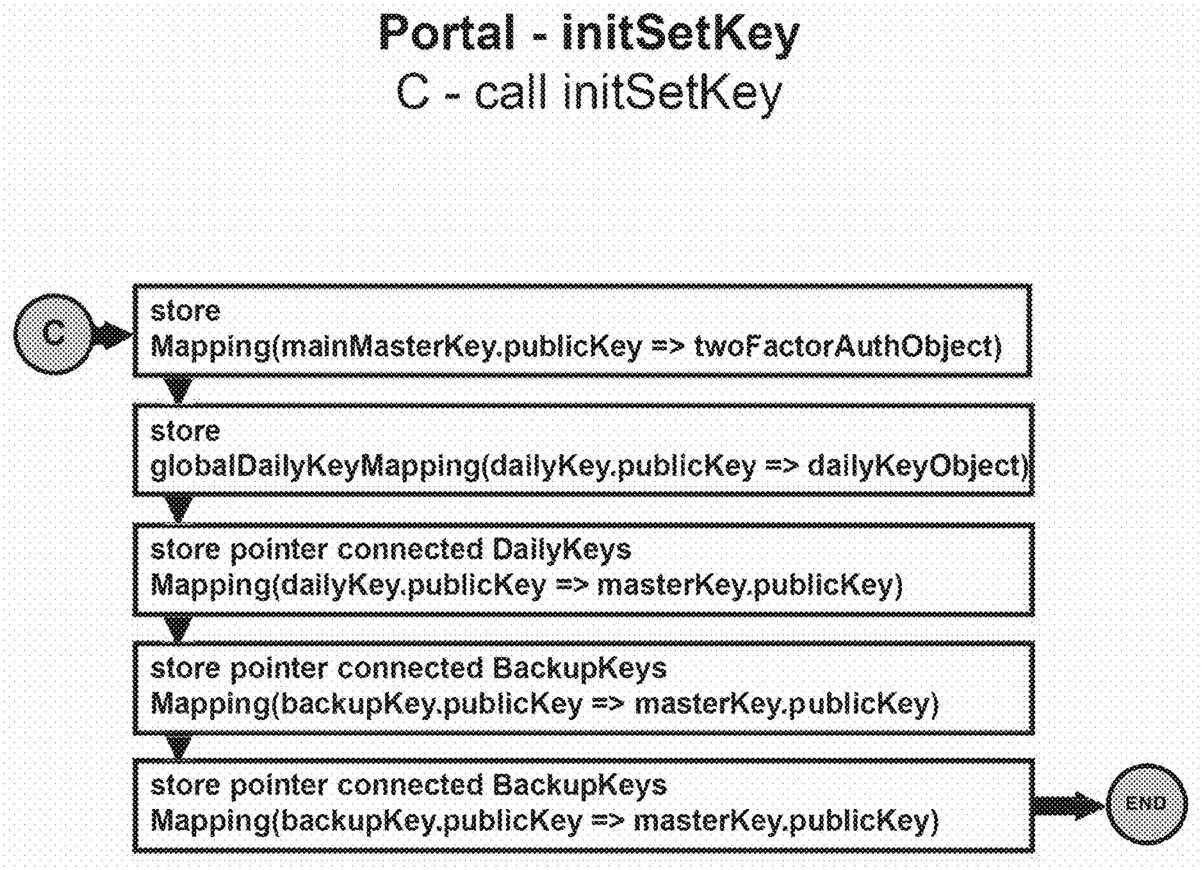
FIG. 9—shows a flowchart of C-call initSetKey(Portal—initSetKey).

Although these are general figures for the counterfeit market and not just for limited edition collectibles, it can be assumed that the trends are similar there as well. This is a particularly serious problem for brands that produce high-end limited-edition products, including:

Using a sticky, small, thin (about 0.11 mm thick and 30 mm in diameter) version of the Tag (TagSticker), any physical product can be turned into an item with a unique cryptographic identity that cannot be replicated, as illustrated in an example of FIG. 5).

Each tag contains unique Asymmetric key pairs that is generated once on the chip.

Figures 4A, 4B:
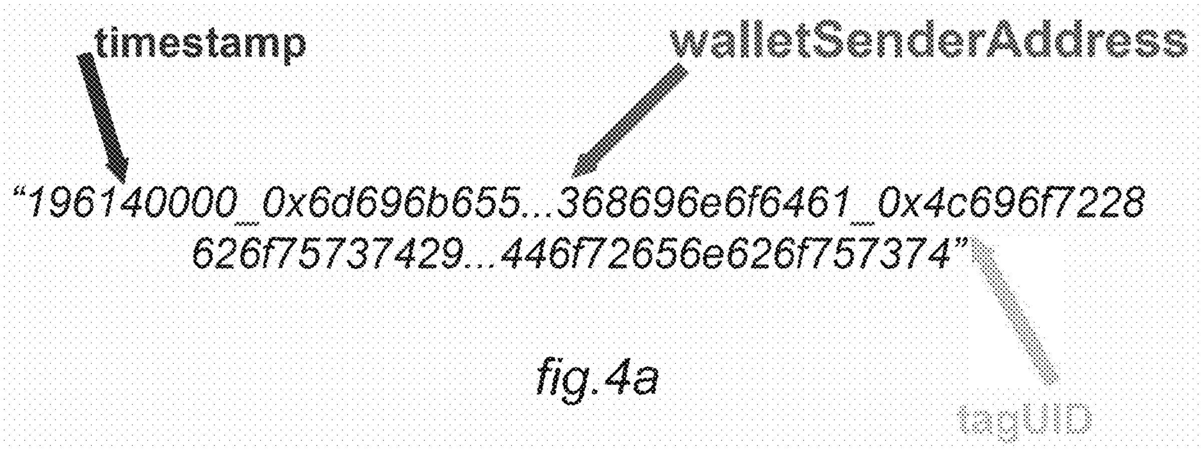
FIG. 4*a*—shows a string message example.
FIG. 4*b*—shows an ECDSA signature output base an string message.

The chip's Cryptographic Signature (ECDSA) can only be verified on-chain, directly on the Portal (see FIGS. 4*a* and 4*b*).

The same public Key serves as the official and decentralized serial Number of the product, which cannot be copied, duplicated, or counterfeited. The advantages are:

1. Verify real quantity—The blockchain network keeps the list of (PublicKey) Tag Stickers that the manufacturer has registered. Any consumer or third-party reviewer can verify that Limited Edition products were created in exactly the right quantity, and that no copies were made "in black" after the official vending event.
2. Guaranteed future authentication—Unlike centralized systems that depend on the manufacturer's server, the system discloses a method where the information is stored forever on the blockchain network. Even if the manufacturer closes its operations, it is still possible to verify the authenticity of the product years later. There is no need for a special application, a private database, or interfacing with existing servers.

Figure 24:
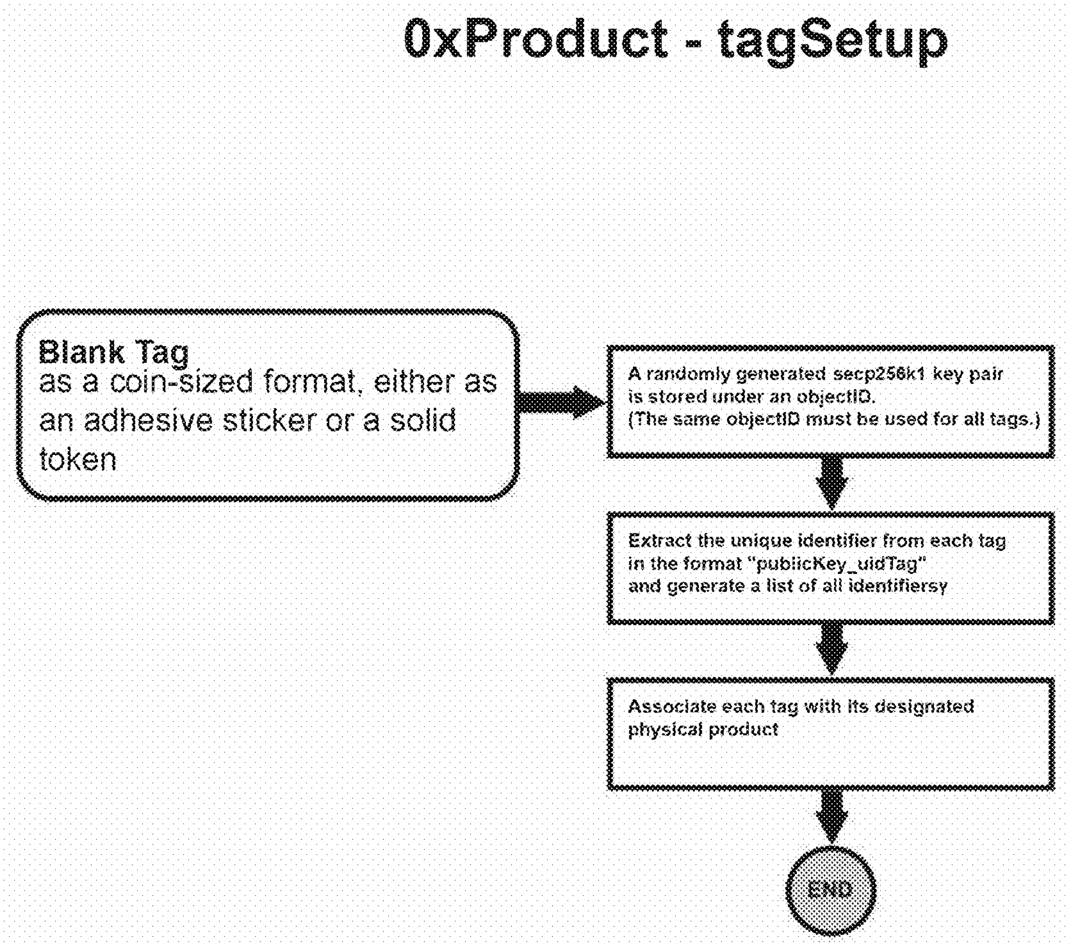
FIG. 24—shows a flowchart of OxProduct—TagSetup.
Figure 25:
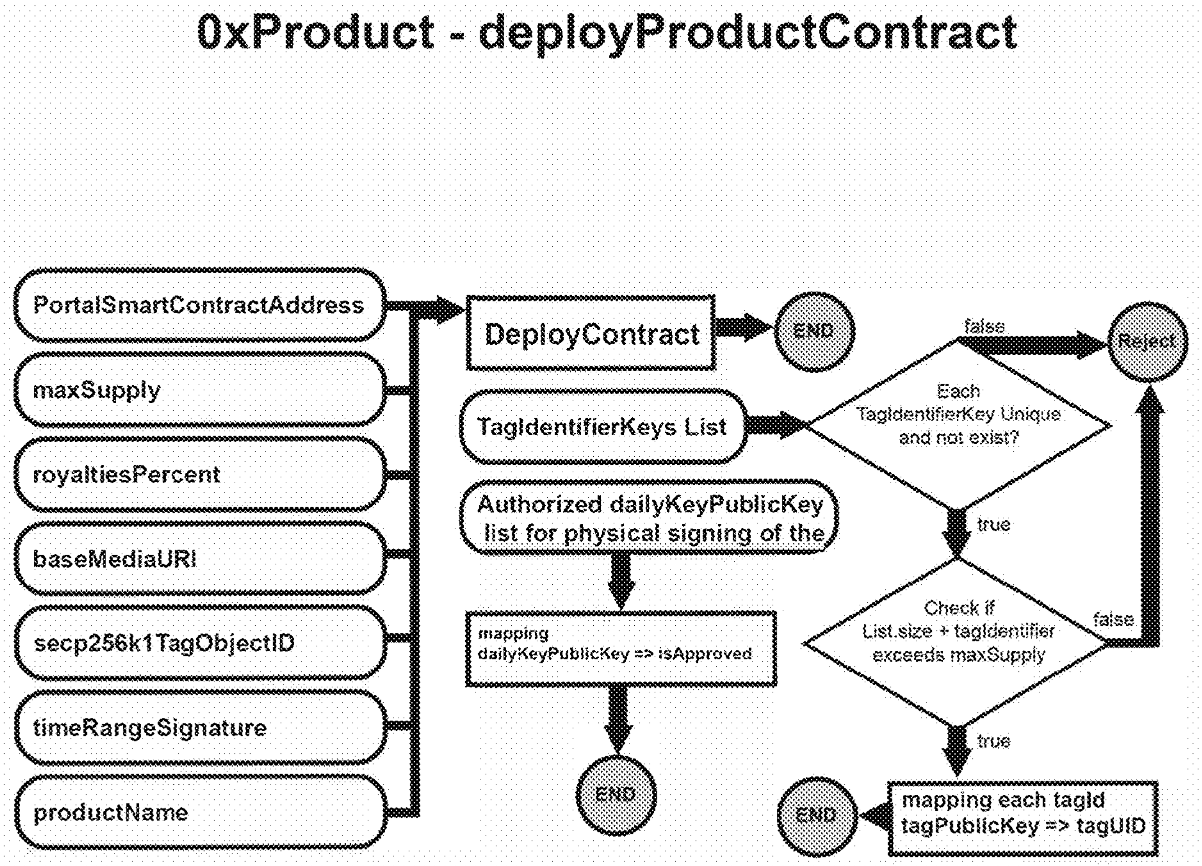
FIG. 25—shows a flowchart of OxProduct—deployProductContract.
Figure 26:
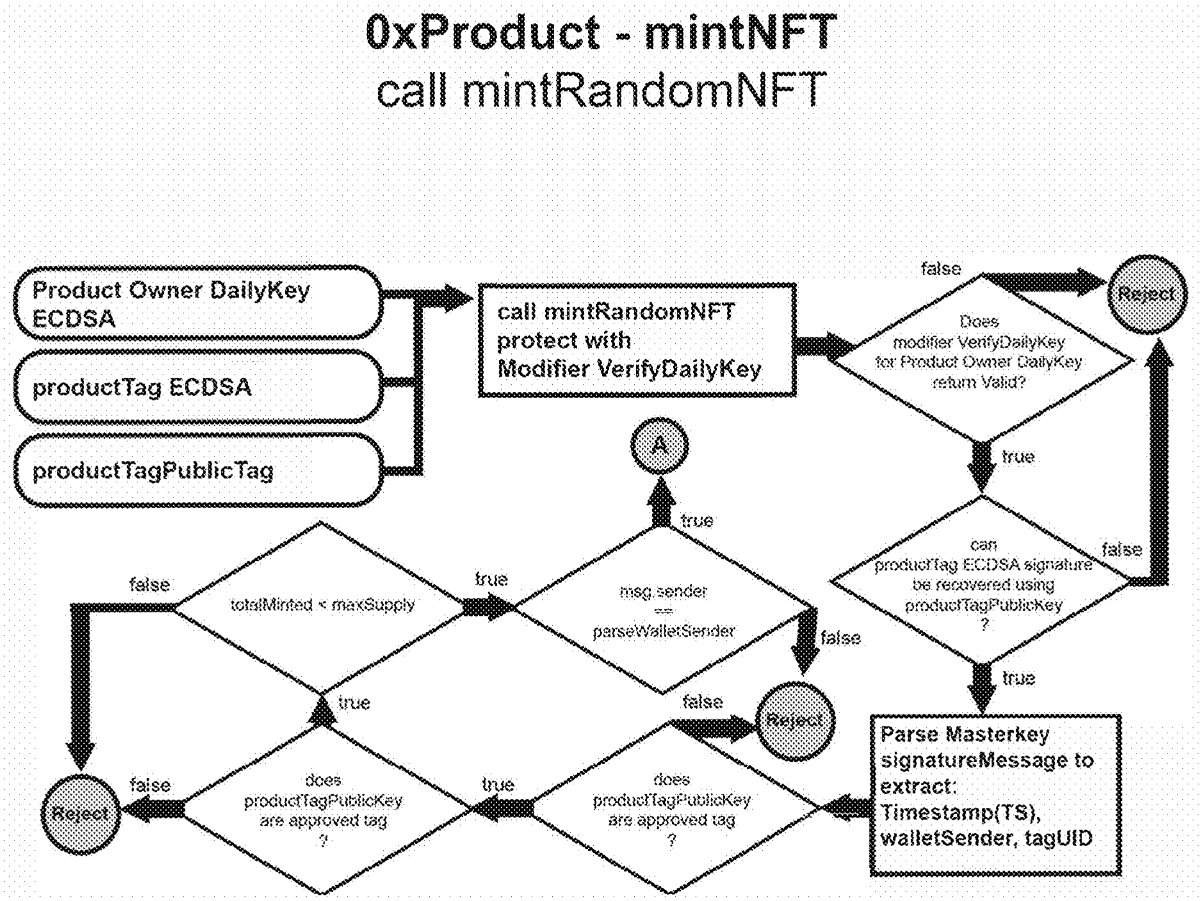
FIG. 26—shows a flowchart of OxProduct—mintNFT call mintRandomNFT.
Figure 27:
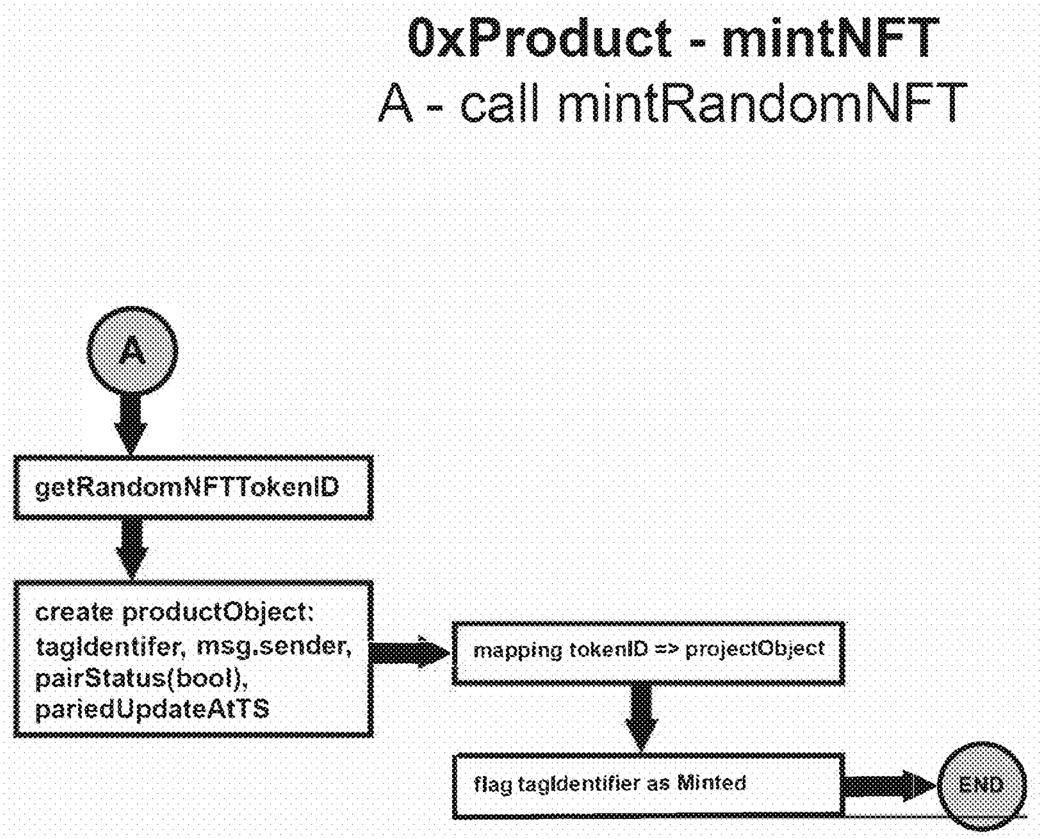
FIG. 27—shows a flowchart of OxProduct—mintNFT A—call mintRandomNFT.

In conclusion, the TagSticker allows the uploading of the physical product to the blockchain network (see FIGS. 24 and 25) and create an NFT twin that represents the physical product on the blockchain network (see FIGS. 26 and 27).

This subject matter related to the TagSticker as a physical tag generating an ECDSA signature for direct authentication on the blockchain is already in basic form with companies likeArx with HaLo NFC products.

However, these solutions are still in their infancy and not yet integrated at scale and not offering the advanced functionality that was developed.

The Method of Safe Vending of Physical Product

Figure 29:
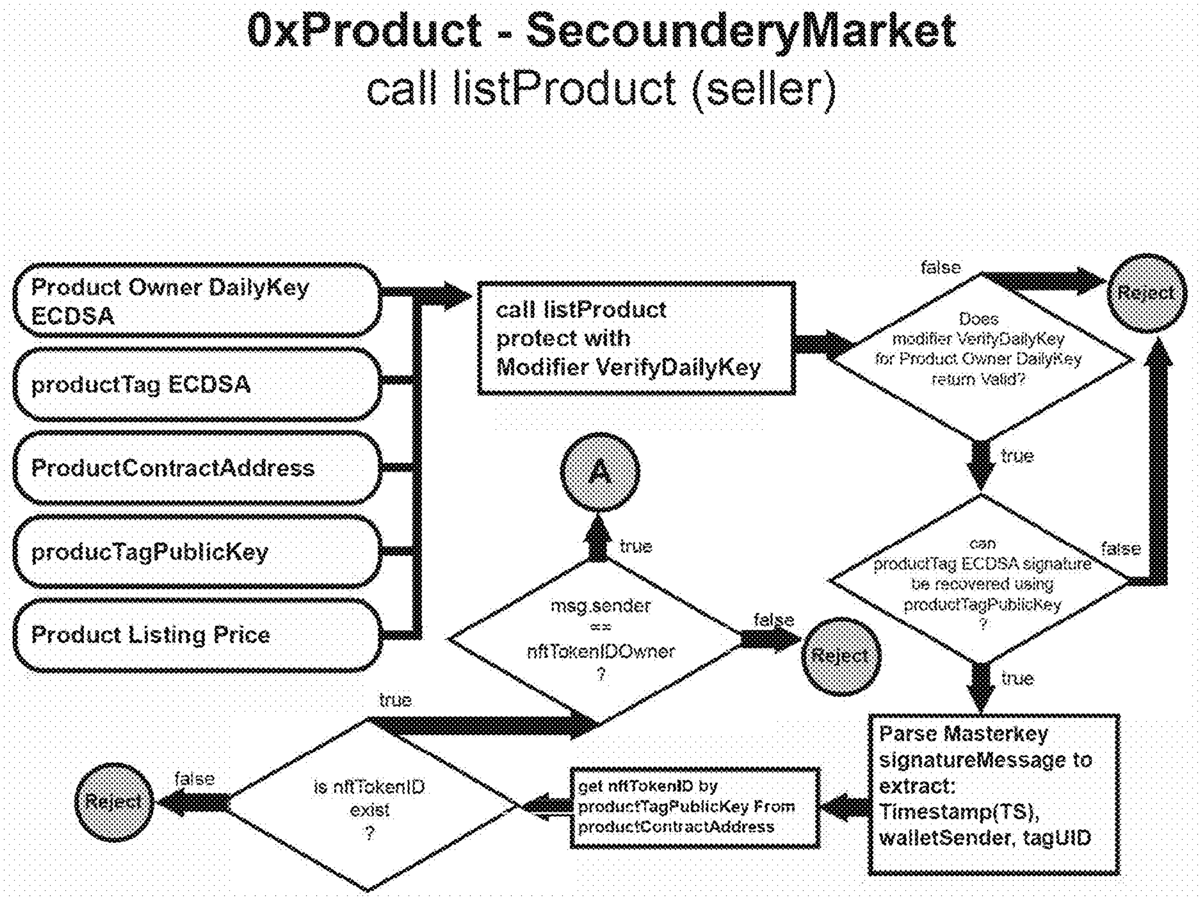
FIG. 29—shows a flowchart of OxProduct—Secoundery-Market call listProduct (vendor)
Figure 30:
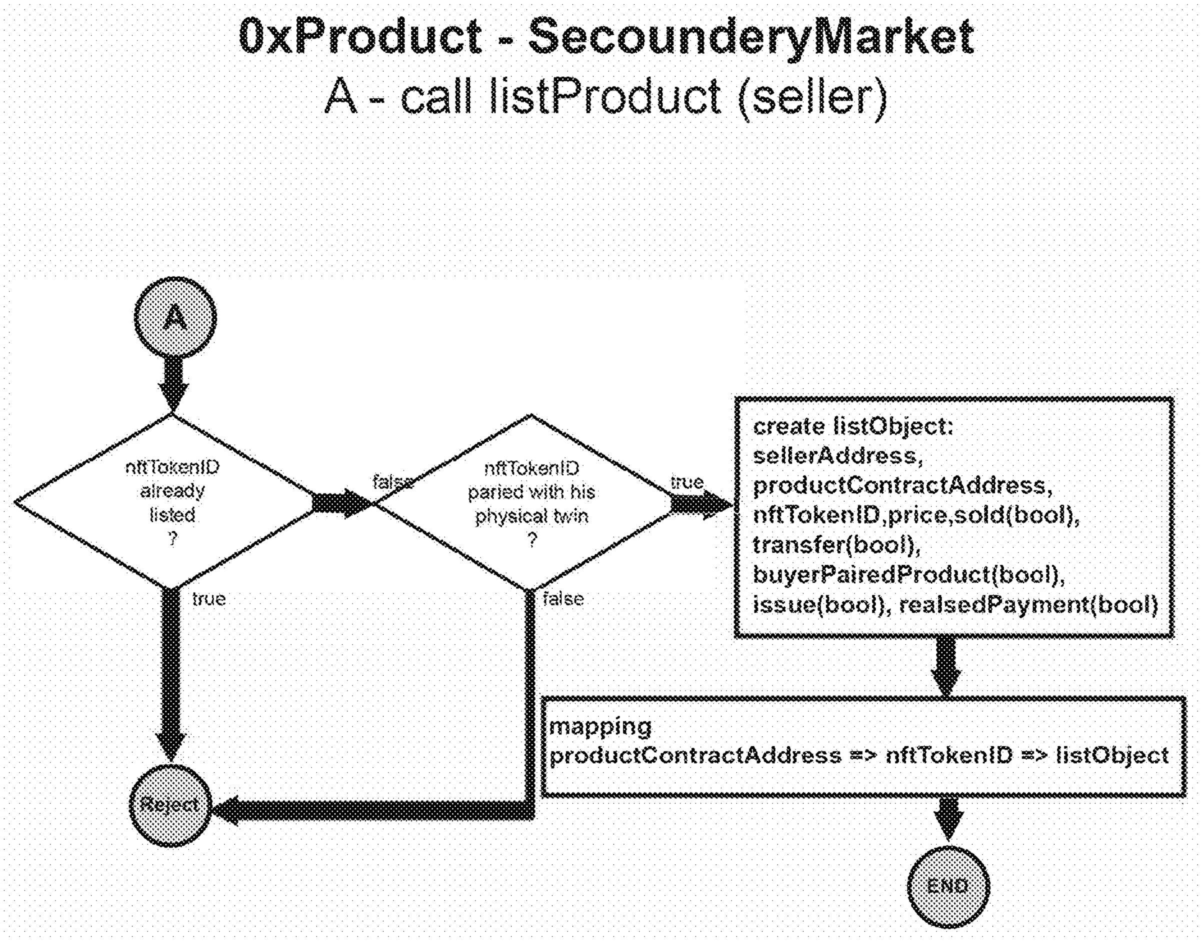
FIG. 30—shows a flowchart of OxProduct—Secoundery-Market A-call listProduct (vendor)

The method of secure and smart vending process was built on the NFT twin that represents the physical product on the blockchain network (see FIGS. 26 and 27). Only the owner of the NFT, who is connected to the physical TagSticker, can make available the product available for vending (see FIGS. 29 and 30).

To do this, he must sign an ECDSA signature from the physical TagSticker to prove that the product is physically in his possession, as illustrated in an example of FIG. 4*b*).

Figure 31:
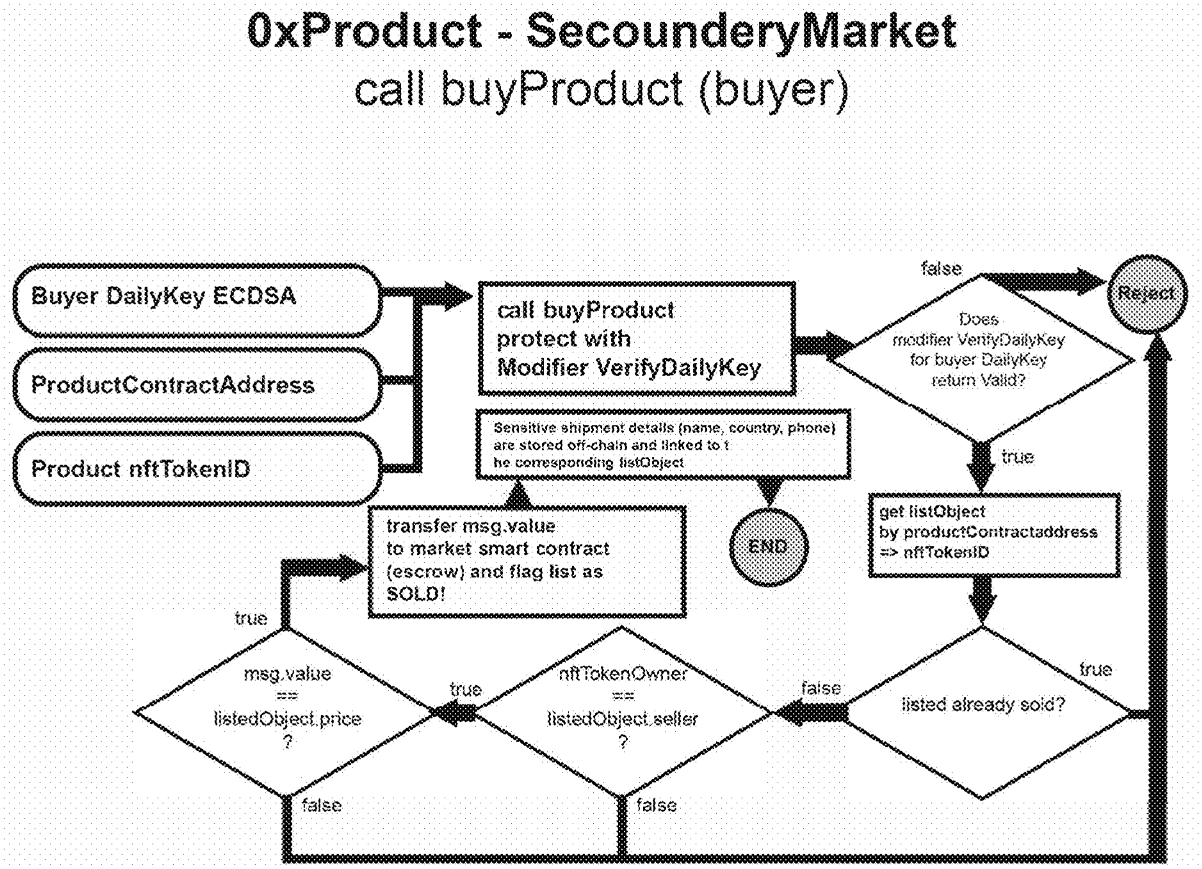
FIG. 31—shows a flowchart of OxProduct—Secoundery-Market call buyProduct.

The client sees the item available for vending on the website and acquires it, he can be sure that it is original, since only the vendor who is connected to the physical Tag Sticker can make available the product. He then makes the disbursement which is entrusted to a Smart Contract Escrow, as illustrated in an example of FIG. 31).

Figure 32:
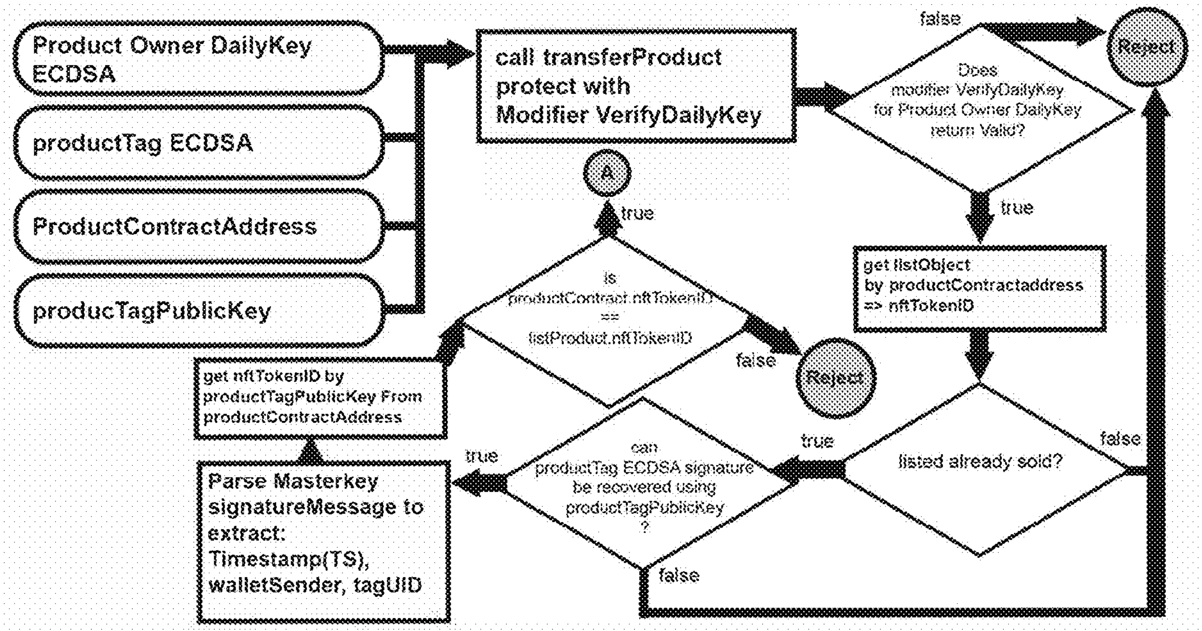
FIG. 32—shows a flowchart of OxProduct—Secoundery-Market call transferProduct (vendor).
Figure 33:
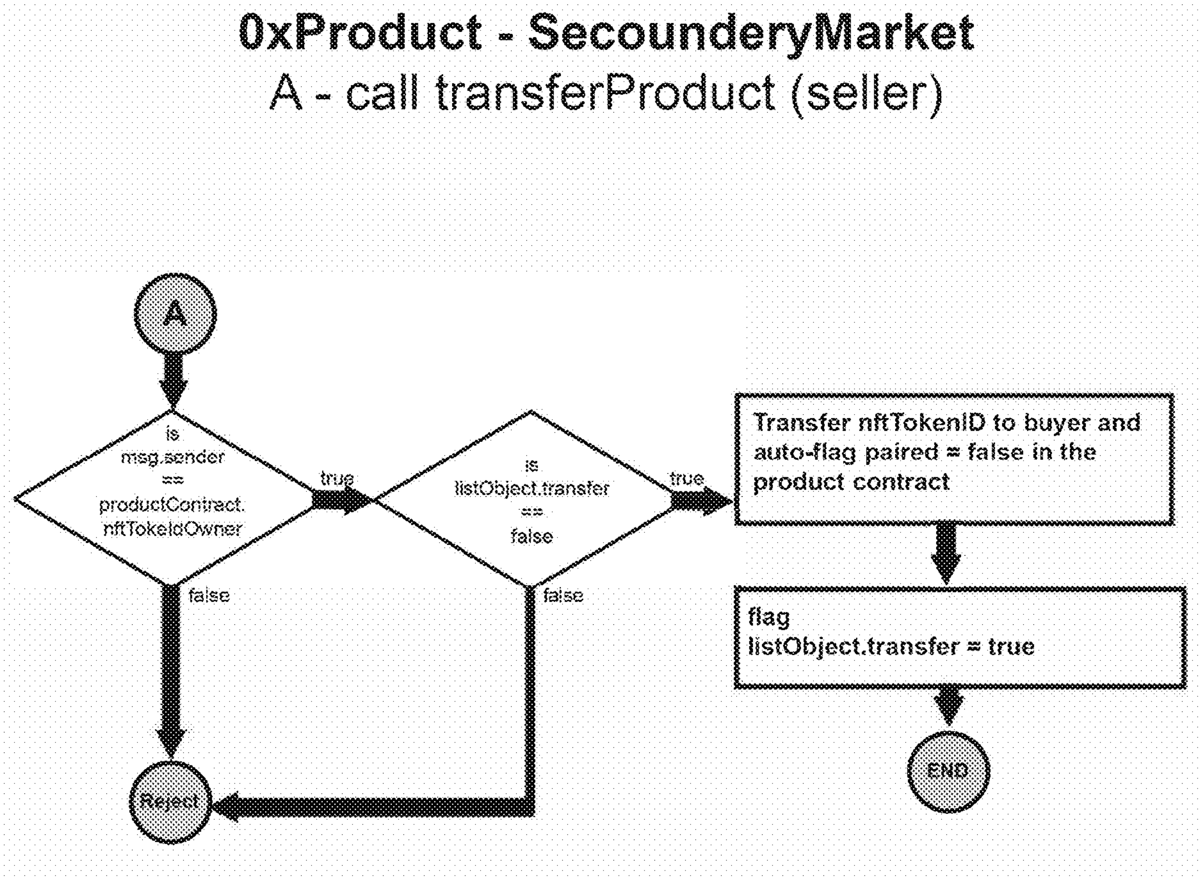
FIG. 33—shows a flowchart of OxProduct—Secoundery-Market A-call transferProduct (vendor).

The vendor sends the product to the client, not before he signs with the TagSticker again to prove that the product is still in his possession. Sometimes the exchange takes a few days, so it is important for the vendor to prove that the product is still in his possession (see FIGS. 32 and 33).

Figure 34:
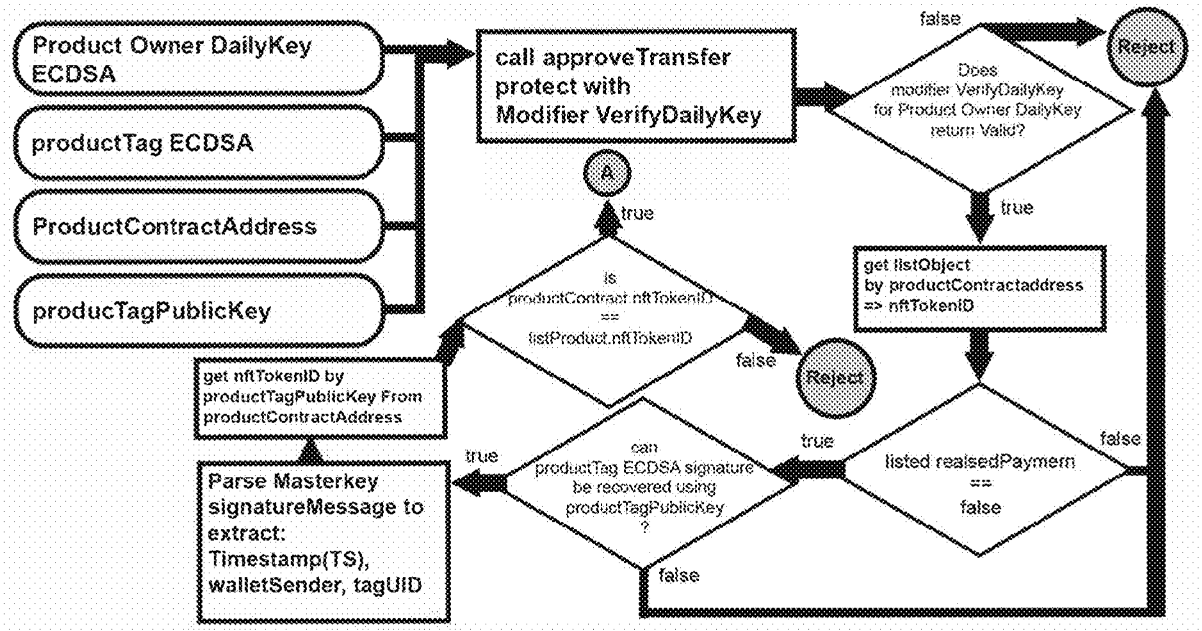
FIG. 34—shows a flowchart of OxProduct—Secoundery-Market approveTransfer.
Figure 35:
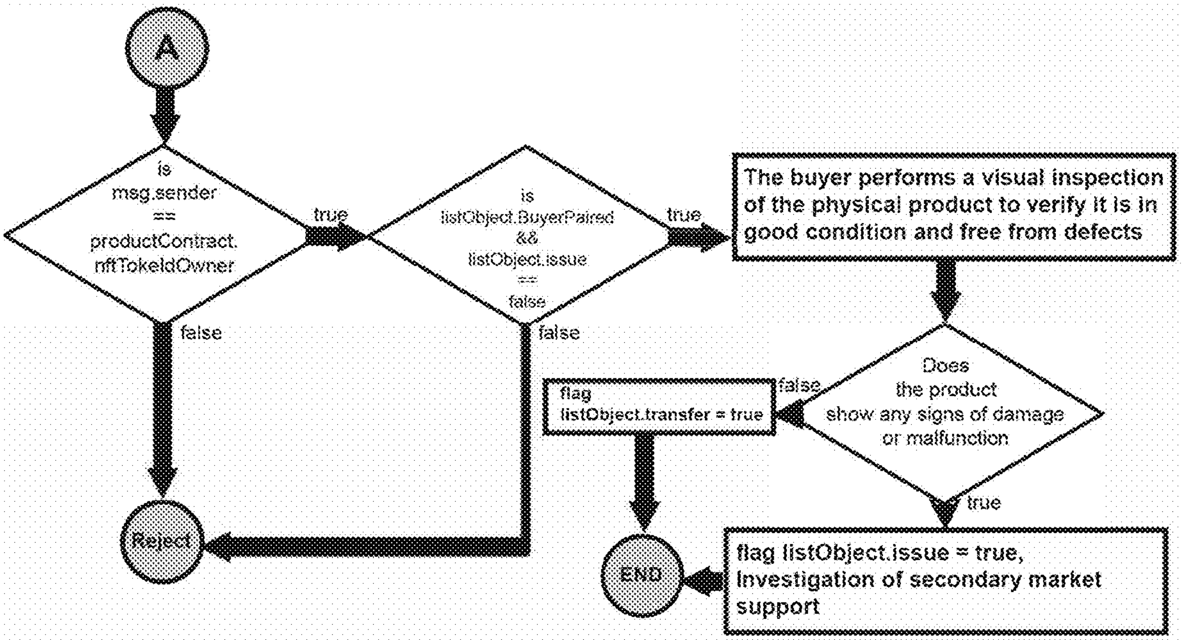
FIG. 35—shows a flowchart of OxProduct—Secoundery-Market A approveTransfer.
Figure 36:
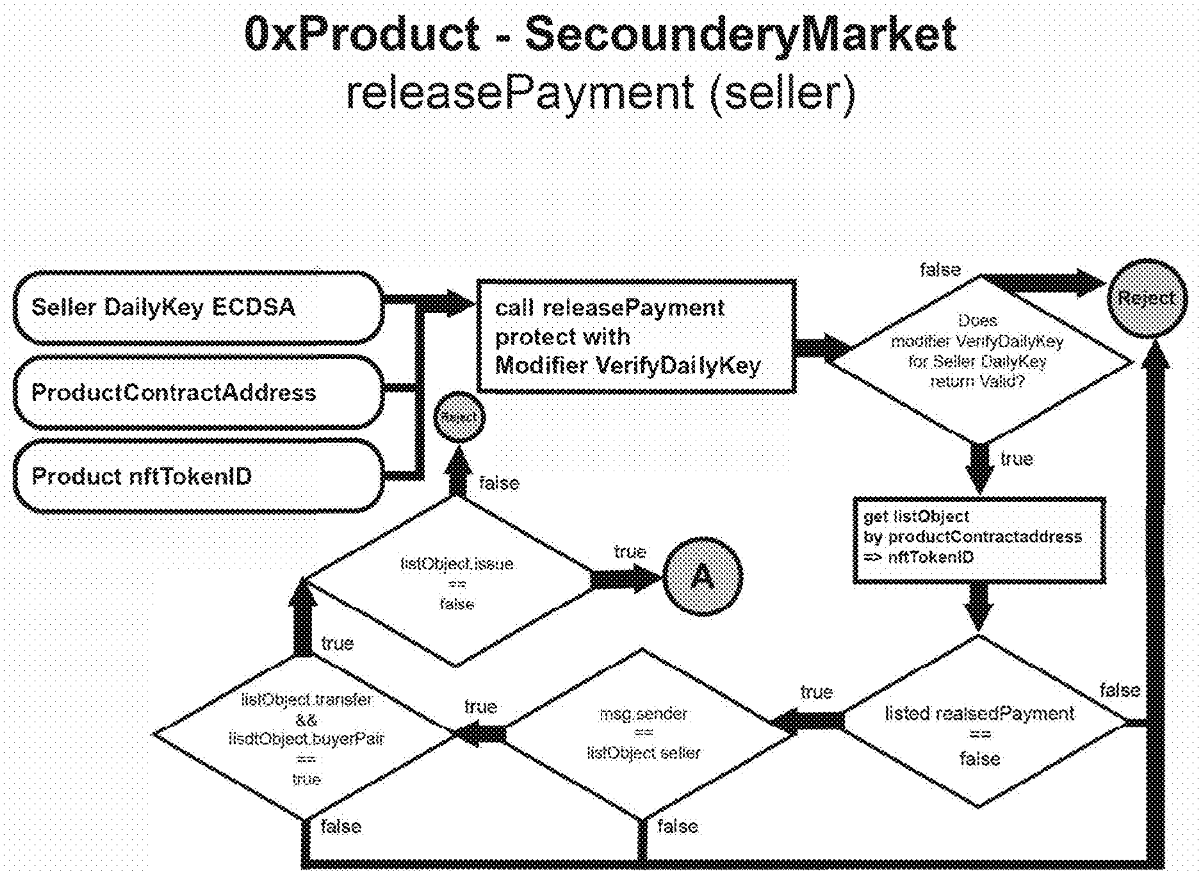
FIG. 36—shows a flowchart of OxProduct—Secoundery-Market releasePayment (vendor).
Figure 37:
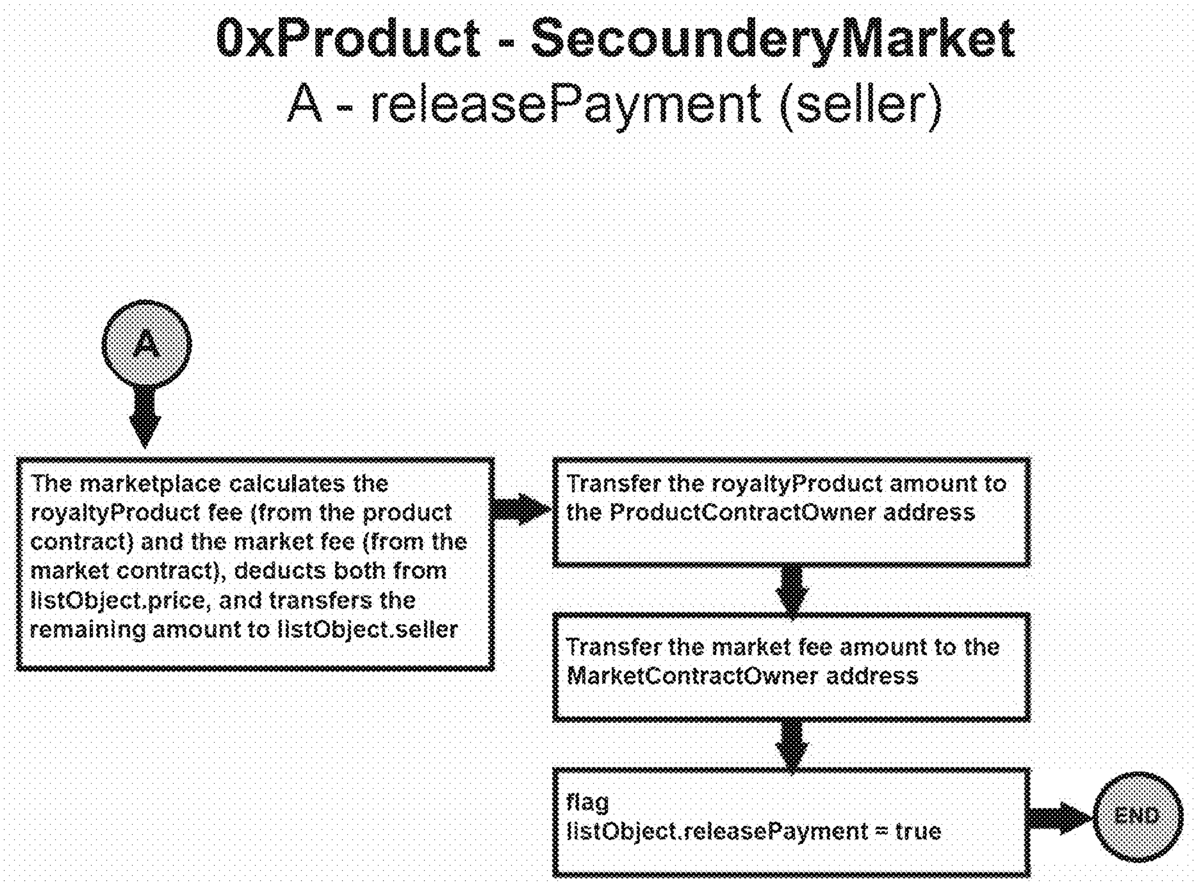
FIG. 37—shows a flowchart of OxProduct—Secoundery-Market A-releasePayment (vendor).

Once the product has arrived, the client scans the TagSticker and generates an ECDSA signature with the Tag to confirm that the product has been received and is in good condition, (see FIGS. 34 and 35). Only after this verification, the money is released from the ESCROW and sent to the vendor (see FIGS. 36 and 37).

Based on the on-chain linkage of the physical product with NFT technology, brands that create the product can access a new and ongoing earning stream from re-vending collectibles, which does not exist in today's market. This is a critical point: in the secondary market for limited-edition products, prices are driven by scarcity and the strength of the brand, factors that boost the item's value after the initial vending event, yet the brand currently receives none of the income from those events (see FIGS. 36 and 37).

In some aspects, the system includes a secondary market platform configured to restrict listings to users who possess a corresponding NFT. Authenticity of one or more collectibles associated with the corresponding NFT can be validated by the blockchain-based user identification system prior to listing. In some aspects, upon successful completion of a secondary market sale, the blockchain-based user identification system can automatically transfer, by the blockchain-based user identification system, a royalty fee to an owner and update the blockchain to reflect a new owner of an NFT and one or more collectibles.

A method is also disclosed for authenticating and transferring authorized control of a physical collectible in a secondary environment using any of the herein disclosed blockchain-based user identification systems. The method can include associating an NFT with one or more collectibles at a time of issuance. The NFT can be registered on a blockchain and uniquely identifies the one or more collectibles. The method can include permitting only the current NFT authenticator, as verified by the blockchain-based user identification system, to initiate a listing of the one or more collectibles for secondary authentication. The method can include verifying, by the blockchain-based user identification system, a legitimacy of the listing by confirming a possession of the NFT and a linkage between the NFT and the one or more collectibles. The method can include upon completion of an authorized transfer, updating the NFT to reflect a new identity of an authenticator to transfer both digital and physical authentication. The method can include automatically recognizing and recording the authorized transfer each secondary authentication event.

In another embodiment the Portal is not limited to 2FA. The system also supports another type of authentication: Single Factor Authentication (SFA) where access only requires the daily Key, regardless of the crypto asset tool (see FIGS. 21 and 22).

Using SFA allows for independent physical-cryptographic authentication, which is suitable for a wide range of real-world uses: Verifying signatures, entry to events, confirmation receipt of a product and more, without the need for a seed phrase, asset tool, or account, as illustrated in an example of FIG. 21, 22, 41.

When calling the function PortalSmartContract.verifyDailyKey other than the (function parameters):

ECDSA (message,r,s)
r:0x35b51e4b4cbd22b807940af09637e3885c1eacOc989dfbd39f6b524d5c706d2f
s: 0x544abd7ff9555ef75c07c4ff781a6b21eb8c0251887b3f5f06d019a9eb640e49
Message:1752821290_0x8CC1F9D204752CE4F4DA34CA9DECBEBD42F9746C_0x00000400500167A59B7CB97DOB045A8282062090
TagPublicKey: 0x8CC1F9D204752CE4F4DA34CA9DECBEBD42F9746C
gets an additional value AuthType, where it is possible to select either 2FA or SFA and it is enough to check that the DailyKey is verified.

Figure 28:
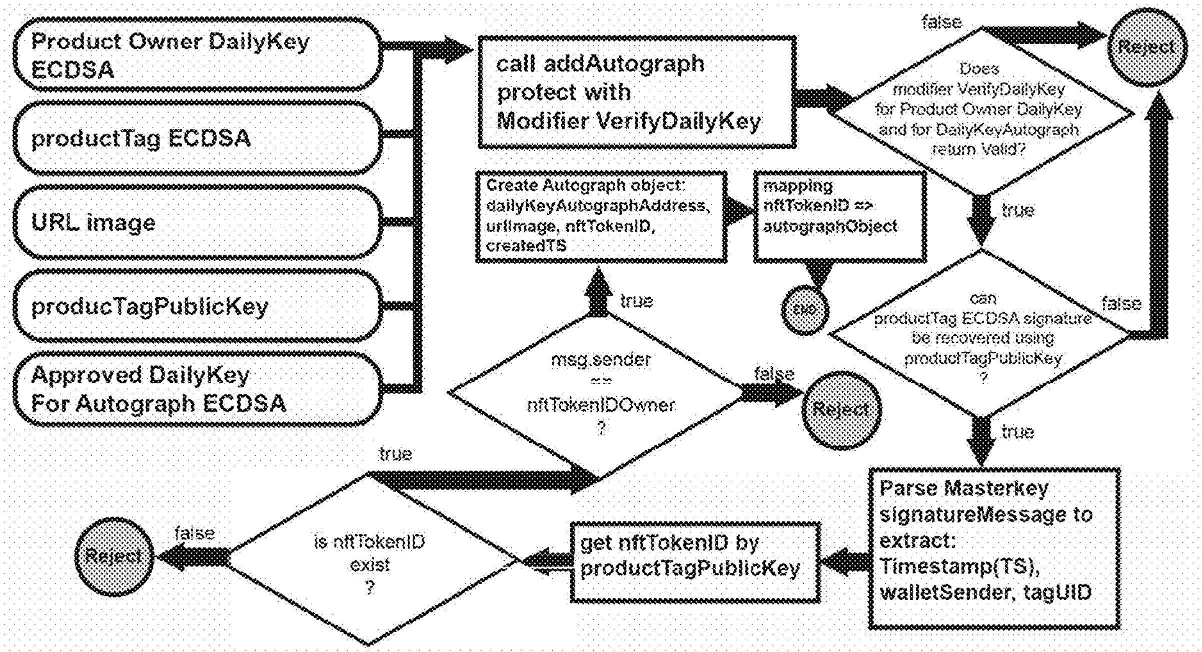
FIG. 28—shows a flowchart of OxProduct—FlagNFTAsAutographed call AddAutograph.

Portal auth autographs on physical products, as illustrated in an example of FIG. 28.

Once the user obtains the physical collectible (e.g., a vinyl record) having an affixed TagSticker, they launch the dedicated application and select the "Upload Physical Signature" option, which activates the device camera.

1. Physical Signature Capture

The public figure (e.g., the singer) manually signs the surface of the collectible.

The user photographs the handwritten signature via the application; the resulting image is stored as visual evidence.

2. Cryptographic Signing Via Tag

The user requests the signer to tap their personal Tag (DailyKey) against the singer's mobile device's NFC reader.

The Tag generates an ECDSA signature over a message composed of the collectible's unique identifier and a current timestamp and transfer it to the user.

3. On-Chain Validation Call

The application submits a exchange invoking addAutograph(itemId, signature, timestamp, visualProofURI) on the collectible's NFT smart agreement.

Within that exchange, addAutograph delegates to PortalSmartContract.verifyDailyKey to verify the cryptographic authenticity.

PortalSmartContract.verifyDailyKey returns a tuple:

isValid (bool)

dailyPublicKey (address)

senderAddress (address)

reason (string)

4. Signer Authorization Check

The NFT agreement compares the returned dailyPublicKey against its on-chain "Authorized Signers" registry. Only if isValid==true and the key appears in the registry does execution proceed.

5. NFT Certification Update

Upon successful validation and authorization, the NFT's metadata is updated on-chain:

The token is marked as "Signed by [Artist]" in its attributes.

The visualProofURI (link to the signature image) is recorded either on-chain or in an IPFS-backed off-chain store with a cryptographic hash reference 6. Immutable Audit Trail All steps, from Tag signature generation to on-chain metadata update, are permanently recorded in the decentralized ledger, ensuring verifiable proof of authenticity and preventing replay or tampering with.

OxSmartLogin

With all the developments, the mechanism for registering and logging in to websites and digital services using a username and password has hardly changed over the decades. This is a one-step authentication protocol (SFA) that has been with us since the days of time-sharing computers in the 1960s:

Log in to your computer: You need to remember a unique password—it is vulnerable to theft or forgetting.

Registering for a website: Registration via email and password—here too it can be stolen, forgotten, and even the password recovery process may encounter difficulties if we forgot the username or password of the email box itself.

In the early 2000s, two-factor authentication (2FA) came into use, which added "something there is" to a username+password:

SMS-OTP—is a one-time code that is valid for a limited period, which comes as an SMS message. Disadvantage: Vulnerable to SIM-swap attacks.

TOTP—is an authenticator app (like Google Authenticator) that issues a new code every 30 seconds. Disadvantage: Requires installation and management of the user account in the app.

Email-OTP—is a one-time code received by email. Disadvantage: Less secure against fishing and vulnerable to late mail times.

Hardware Token (Physical TOTP)—is a separate device (like a "fob") that generates TOTP codes just like an app, only that in an isolated chip the costs are high and usually without a built-in backup solution, meaning that it is possible to pre-register with multiple devices or save the one-time backup codes twice.

Figure 41:
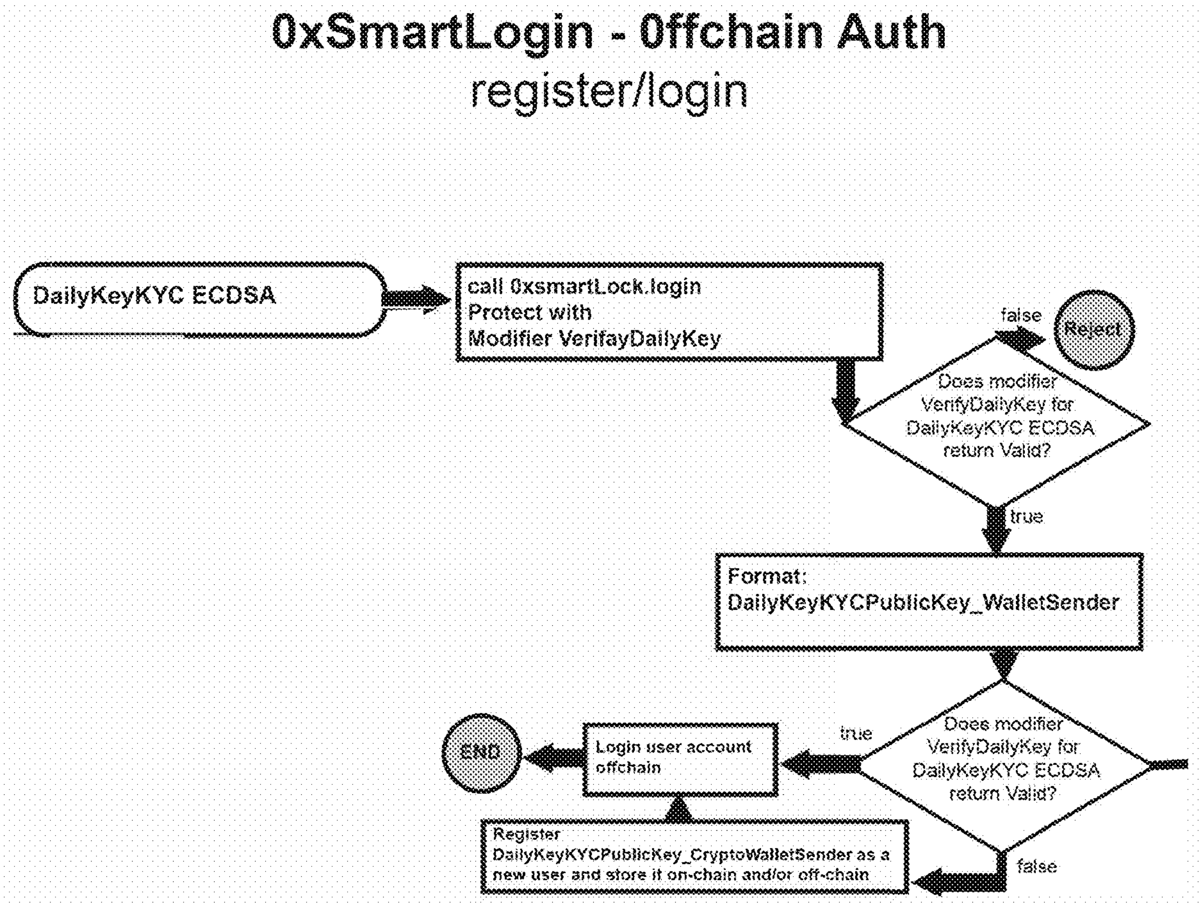
FIG. 41—shows a flowchart of OxSmartLogin—Offchain Auth register/login.

Portal solves all these challenges. As described above, it was shown how the smart agreement of a blockchain project makes a call to PortalSmartContract.verifyDailyKey with authentication of user's ECDSA (dailyKey) signature. Off-chain service can send the ECDSA DailyKey of a user to Portal and receive an Off-chain validation based on the verification that has been performed under Portal, as illustrated in an example of FIG. 41.

How does the process work (for example on the Internet).

Enrollment:

1. Instead of the traditional username and password, the client enters his: DailyKey (ECDSA) and CryptoWalletSender (ECDSA).
2. The site transmits the appropriate signatures to Portal verifying on the blockchain the full 2FA authentication.
3. After successful authentication is confirmed, a unique identifier consisting of a DailyKey PublicKey_CryptoWalletSender (UUID) is stored on the off-chain server to be used later to identify the user.

Connecting

1. Instead of a username and password, the user will resign using DailyKey (ECDSA) and CryptoWalletSender (ECDSA).
2. The site sends the signatures to Portal on the blockchain to verify full 2FA authentication.
3. Once approved, the website receives the DailyKey PublicKey_CryptoWalletSender ID from Portal and checks whether there is a compatible UUID on the off-chain server.
4. If a user with a matching UUID is found, access to the account is granted.

Advantages:

No need to remember a username or password.

Doesn't require separate login credentials for each site; all services log-in using the same DailyKey through Portal are connected.

Low cost and flexibility in backup.

Blockchain security for each website in 5 lines of code—Any website, small or large, can benefit from a strong authentication mechanism without storing passwords on a centralized server; it is enough to embed a call to Portal in a few lines of code to get all the benefits of blockchain, even on medium-sized online stores, small blogs, or government websites (such as the Tax Authority and the Patent Office), all of which use the same security strength without a barrier.

PortalKYC

Portal is used as an anonymous 2FA. There are sensitive applications that it is essential to identify the Portal user and his real details.

Portal KYC (Know Your Client) relies on the principles of the KYC being an identification protocol in which institutions, companies, and digital services verify the user's identity before they can access the system.

This identification is essential not only for regulatory needs, but also for preventing impersonation, Bot detection, and filtering out fraudulent attempts.

On Portal, any user who holds a crypto asset tool along with three Tag2FA tags can independently register for a smart agreement.

With the new PortalKYC model, the registration process becomes more controlled and secure:

The user performs a KYC procedure-identification by means of a digital ID card or identification facing a human representative and is provided a cryptoWallet-tAddress that is associated with him.

Once the KYC is confirmed, a verified identity on an off-chain server is assigned to the user. This is a unique identifier (UUID), for example: LP2605921L.

Unlike the open version of Portal, here only the owner of (PortalKYC Smart Contract), who deployed the agreement to the blockchain network, can register new users. The owner allocates the user three Passive tags (as detailed in FIG. 2).

In TwoFactorAuth in PortalKYC the agreement owner is allocated an user UUID in addition to the three above Tags that was previously assigned to user in the server. The initial cryptoWalletSender is defined as cryptoWalletAddress that the user has provided when subscribed to KYC, as illustrated in an example of FIG. 40.

Once registered, the three Tags are sent to the user. He can choose to stay with them or update to a new set for security purposes, but in any case, the UUID assigned to him remains the same and is not changeable.

Figure 42:
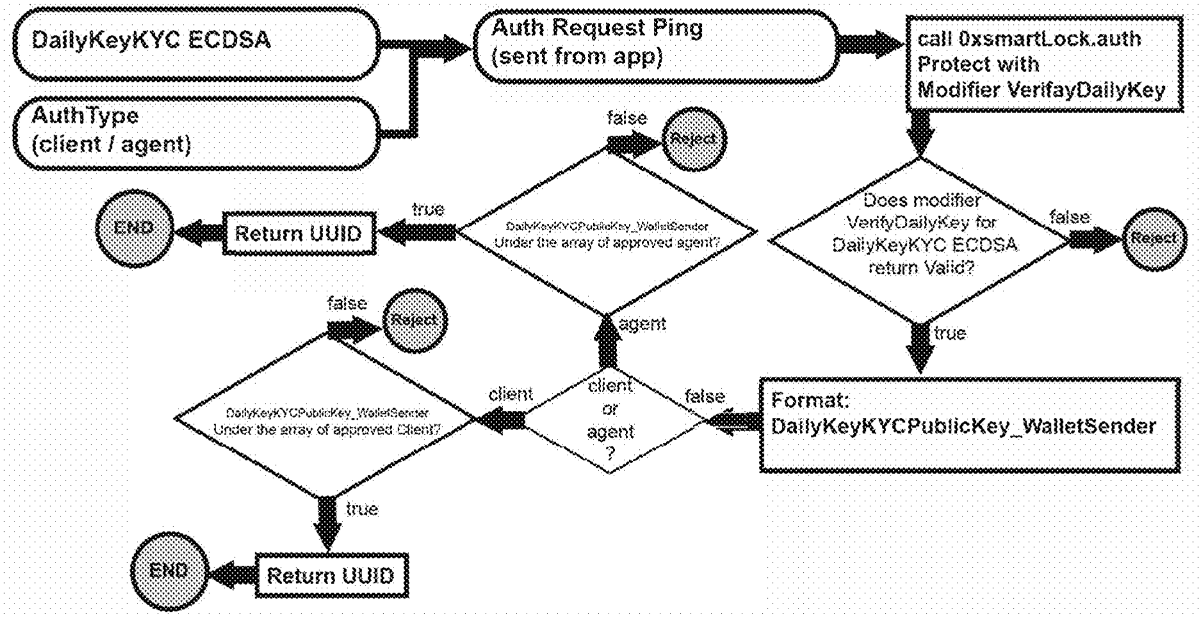
FIG. 42—shows a flowchart of OxSmartLogin—Offchain Auth client/agent.

The same principle can also be applied to identification systems, for example with the authorities or a bank service representative, as illustrated in an example of FIG. 42:

1. The client calls the call center for service, and a representative answers.
2. Instead of the agent identifying the client by his "voice" or 4 digits on the back of the card, he sends a request for an ECDSA signature using the dailyKey through a dedicated app on the client's phone.
3. The client confirms the request by signing with his dailyKey (ECDSA), and the representative receives unequivocal cryptographic confirmation that the person on the line is indeed the account holder.

This method prevents revealing sensitive information through fake phone calls.

The principle can also be applied in the opposite direction—for the purpose of verifying the identity of the representative vis-n-vis the client. A common phenomenon, especially among adults or people speaking a limited language, is the receipt of supposedly fake calls from the depositary institution (e.g., bank) or the police, in which they are required to pay an immediate debt or provide access details to the client account. Using the signature mechanism can prevent fraud.

For example, when the depositary institution initiates a call to the client in order to perform an action on the account, as illustrated in an example of FIG. 42:

1. The client sends a request to the depositary institution representative, through a dedicated app, to sign with dailyKey (ECDSA).
2. The representative signs and the client checks the signature against the depositary institution's smart agreement of authorized representatives.
3. Only if the signature is valid and is on the list of verified signatures, does the client knows for sure that it is a real representative.

In this way, it is possible to accurately prevent phone fraud and impersonation by malicious actors, and to restore control and trust to the client.

What is claimed:

1. A method for two-factor authentication (2FA) in a blockchain-based user identification system using cryptographic permissions and implementing a process of validation and transparency of a blockchain to physical services in the real world, comprising:

assigning, by an agreement owner, at least three passive Near Field Communication (NFC) tags to a user, comprising a key set including: (i) a DailyKey tag used for signing and 2FA authentication, (ii) a BackupKey tag dedicated to backup for restoration or replacement, and (iii) a MasterKey tag serving as—Root Authority, wherein the agreement owner is responsible for assigning the NFC tags and registering the NFC tags on-chain, and wherein a Portal smart agreement-based verification node provides key approval;

in response to a user calling a function portalSmartContract.initKeySet, registering the key set of the user by the Portal on the blockchain;

allocating a universally unique identifier (UUID) to the user, wherein the UUID is immutable following assignment;

generating, by one of the NFC tags, a private key in a random and secure manner without revealing the private key to the user;

transmitting the NFC tags to the user, and permitting the user to update to a new set of NFC tags while maintaining the UUID, wherein the blockchain-based user identification system employs the UUID and the NFC tags for subsequent cryptographic authentication events; and assigning the key set linked to a walletSenderAddress, wherein two Elliptic Curve Digital Signature Algorithm (ECDSA) signatures are required: (1) from the DailyKey tag within the blockchain-based user identification system, and (2) from the walletSenderAddress linked to the DailyKey tag.

2. The method of claim 1, wherein the NFC tags are used in conjunction with a signature based on the ECDSA generated by a daily-use cryptographic key (the DailyKey tag) possessed by the user through physical means including a Printed Circuit Board (PCB) card, a ring, or an embedded chip in a mobile device, providing asynchronous signature functionality for authenticatinq an identity of the user on the blockchain.

3. The method of claim 2, further comprising:

receiving a request from a service representative for the user to provide an ECDSA signature using the DailyKey tag via a dedicated application; and verifying, by the service representative, a cryptographic authenticity of the signature to confirm an identity of the user, wherein sensitive personal data is not disclosed during an authentication process.

4. The method of claim 1, wherein an authentication process is reversible to enable the user to verify an identity of a service representative, comprising:

the user initiating a request via a dedicated application for the service representative to provide an ECDSA signature using a dailyKey of the service representative;

the user validating a received signature against a blockchain smart agreement of authorized service representatives, wherein a valid match confirms a legitimacy of the service representative and prevents impersonation or fraud.

5. The method of claim 4, wherein the blockchain-based user identification system is configured to be applied to a plurality of use-cases, including; governmental, secondary market, and other regulated identity verification scenarios.

6. The method of claim 1, wherein the blockchain-based user identification system is configured to mitigate a risk of private key or seed phrase leakage due to malware infection on a user device.

7. The method of claim 1, wherein at least one of the NFC tags is operable to generate cryptographic signatures internally, wherein the private key remains isolated from any device infected with malware.

8. The method of claim 1, wherein the blockchain-based user identification system prevents exposure of a hot asset tool generated seed phrase to malware by requiring all cryptographic operations to be performed within the NFC tags.

9. The method of claim 1, further comprising: in response to determining that a device used to interact with one of the NFC tags is compromised by malware, detecting the compromise and alerting the user.

10. The method of claim 1, wherein the blockchain-based user identification system is configured such that even when a user device is infected with malware, the private key and/GF a seed phrase remain secure and inaccessible to the malware due to cryptographic isolation provided by at least one of the NFC tags.

11. The method of claim 1, wherein the blockchain-based user identification system is operable to restrict use of hot asset tools for authentication purposes and/er mandate use of at least one of the NFC tags to minimize credential leakage through malware.

12. The method of claim 1, wherein, in response to receiving a request for action initiated by one or more third party representatives, a mobile device of the user requires a digital signature generated using an ECDSA-based DailyKey associated with the one or more third party representatives, wherein impersonation of a legitimate representative by a malicious actor is prevented.

13. The method of claim 12, wherein the mobile device of the user is configured to verify a received digital signature by comparing the received digital signature against a list of authorized representatives maintained on a smart agreement, wherein a malicious actor is prevented from using an unauthorized signature to perform account actions.

14. The method of claim 1, wherein, in response to determining that a digital signature is valid and corresponds to an authorized representative as indicated by a smart agreement, the mobile device of the user is configured to permit a requested action, wherein one or more attempts by a malicious actor are blocked.

15. The method of claim 1, wherein, in response to determining that a received signature does not match any entry in a list of authorized representatives, the mobile device of the user is configured to alert the user to prevent fraudulent activity by a malicious actor.

16. The method of claim 1, wherein, in response to determining that a digital signature is valid and corresponds to an authorized representative as indicated by a smart agreement, a client device is configured to permit a requested action.

17. A system for decentralized validation and transparency of a blockchain in the real world using a device that connects and serves as a connector between the real world and the blockchain using cryptographic permissions, comprising:

a Tag2FA passive NFC card comprising:

a Printed Circuit Board (PCB) configured as a main component in construction of electronic devices;

a chip configured to allow storage of a pair of asymmetric keys comprising a public key and a private key, wherein the private key is configured for encryption, wherein the public key is configured for decryption or signature generation, without inference between the private key and the public key, wherein the chip generates a signature using the private key in a digital signature algorithm based on elliptical curves, specifically an Elliptic Curve Digital Signature Algorithm (ECDSA), to verify identity, wherein the signature is decryptable using the public key within the blockchain independent of an external server;

an antenna embedded in the PCB enabling communication between an external reader and the chip for sending commands, wherein inscription creation of keys in the chip is performed randomly and decryption is performed in the blockchain, wherein signing is performed using the private key without exposing the private key;

wherein a magnetic field and a resonance created by contact between the reader and the antenna enable the chip to be activated passively without an external power source;

wherein the antenna is tuned to a frequency that accurately correlates with a Radio Frequency (RF) field of the reader;

a capacitor that stores energy in a form of an electric field and is configured for filtering, smoothing, charging, discharging, or separating signals in circuits and adjusting a resonance circuit so that a resonant frequency corresponds to accuracy of communication between the antenna and the chip;

a mobile application configured to generate ECDSA signatures using a dailyKey;

a verification module comprising a processor configured to execute instructions to compare signatures against an authorized smart agreement;

wherein both a user and a service representative are enabled to mutually verify identities of each other over a non-secure communication channel including a phone call.

* * * * *